US012801003B2

(12) United States Patent
Ikeda et al.

(10) Patent No.: US 12,801,003 B2
(45) Date of Patent: Nov. 17, 2026

(54) LIGHT SOURCE DEVICE INCLUDING POLARIZATION DIRECTION CONVERSION ELEMENT, AND PROJECTION DISPLAY APPARATUS INCLUDING THE SAME

(71) Applicant: Panasonic Intellectual Property Management Co., Ltd., Osaka (JP)

(72) Inventors: Takashi Ikeda, Osaka (JP); Yoshiki Tanaka, Kyoto (JP); Makoto Maeda, Nara (JP); Yusaku Nishikawa, Osaka (JP); Manabu Okuno, Osaka (JP)

(73) Assignee: PANASONIC PROJECTOR & DISPLAY CORPORATION, Osaka (JP)

( * ) Notice: Subject to any disclaimer, the term of this patent is extended or adjusted under 35 U.S.C. 154(b) by 305 days.

(21) Appl. No.: 18/624,778

(22) Filed: Apr. 2, 2024

(65) Prior Publication Data

US 2024/0248385 A1 Jul. 25, 2024

Related U.S. Application Data

(63) Continuation of application No. PCT/JP2022/036886, filed on Oct. 3, 2022.

(30) Foreign Application Priority Data

Oct. 5, 2021 (JP) ................................ 2021-164294

(51) Int. Cl.
*G03B 21/20* (2006.01)

(52) U.S. Cl.
CPC ....... *G03B 21/204* (2013.01); *G03B 21/2066* (2013.01); *G03B 21/2073* (2013.01)

(58) Field of Classification Search
CPC .............. G03B 21/204; G03B 21/2066; G03B 21/2073; G03B 21/208
See application file for complete search history.

(56) References Cited

U.S. PATENT DOCUMENTS 11,709,353 B2 * 7/2023 Lin .................... G03B 21/2033 362/84
11,782,334 B2 * 10/2023 Lin ...................... G03B 21/204 362/84

(Continued)

FOREIGN PATENT DOCUMENTS

JP 2008-70691 3/2008
JP 2009-92714 4/2009

(Continued)

OTHER PUBLICATIONS

International Search Report issued Nov. 8, 2022 in International (PCT) Application No. PCT/JP2022/036886.

*Primary Examiner* — Bao-Luan Q Le
(74) *Attorney, Agent, or Firm* — Wenderoth, Lind & Ponack, L.L.P.

(57) ABSTRACT

A light source device includes: a light source element configured to emit first light; a first selective reflection element disposed at a position where the first light is incident, and configured to: (i) transmit a component of first linear polarized light; and (ii) reflect a component of second linear polarized light; a second selective reflection element disposed at a position for receiving incident light that has passed through or been reflected by the first selective reflection element, and configured to transmit or reflect the incident light in accordance with a wavelength region; and a first polarization direction conversion element disposed between the first selective reflection element and the second selective reflection element, and configured to: (1) convert the first linear polarized light into elliptical polarized light; and (ii) convert the elliptical polarized light reflected by the second selective reflection element into the second linear polarized light.

20 Claims, 11 Drawing Sheets

(56) References Cited

U.S. PATENT DOCUMENTS

| | | | | |
|---|---|---|---|---|
| 2005/0094104 | A1* | 5/2005 | Ishizaka ................. | G03B 21/14<br>353/20 |
| 2007/0085971 | A1* | 4/2007 | Okuyama ............ | H04N 9/3105<br>353/20 |
| 2009/0086112 | A1* | 4/2009 | Kaida .................... | G03B 33/12<br>349/9 |
| 2009/0225234 | A1* | 9/2009 | Ward ..................... | G03B 21/26<br>348/744 |
| 2013/0188466 | A1 | 7/2013 | Asakawa et al. | |
| 2014/0347608 | A1 | 11/2014 | Kato | |
| 2015/0153020 | A1* | 6/2015 | Akiyama ............. | H04N 9/3161<br>362/19 |
| 2018/0239233 | A1* | 8/2018 | Kado ................... | G03B 21/204 |
| 2019/0219909 | A1* | 7/2019 | Kado ................. | G02B 27/1026 |
| 2019/0369470 | A1* | 12/2019 | Yang .................. | G03B 21/2066 |
| 2021/0037222 | A1* | 2/2021 | Huang ............... | G02B 27/1013 |
| 2021/0157219 | A1* | 5/2021 | Mikutsu ................. | G03B 21/28 |
| 2022/0128893 | A1* | 4/2022 | Hsieh ..................... | G03B 33/08 |
| 2022/0132086 | A1* | 4/2022 | Liao ................... | G03B 21/2066 |
| 2022/0252240 | A1* | 8/2022 | Chien .................. | G02B 27/141 |

FOREIGN PATENT DOCUMENTS

| | | |
|---|---|---|
| JP | 2012-123179 | 6/2012 |
| JP | 2013-242932 | 12/2013 |
| JP | 2015-38618 | 2/2015 |
| JP | 2018-31823 | 3/2018 |
| JP | 2018-60127 | 4/2018 |
| JP | 2018-130506 | 8/2018 |
| WO | 2013/077204 | 5/2013 |

* cited by examiner

1A

LIGHT SOURCE DEVICE INCLUDING POLARIZATION DIRECTION CONVERSION ELEMENT, AND PROJECTION DISPLAY APPARATUS INCLUDING THE SAME

BACKGROUND

1. Technical Field

The present invention relates to a light source device and a projection display apparatus including the light source device.

2. Description of the Related Art

There are conventionally a light source device and a projection display apparatus including the light source device that irradiates a phosphor wheel with light from a light source to generate light having a wavelength converted, and emits the light from the light source and the light generated by the phosphor wheel.

For example, the light source device irradiates the phosphor wheel with blue light emitted from a light source unit to generate yellow light, and synthesizes the generated yellow light and blue light emitted from the light source unit to generate white light. The projection display apparatus further separates the white light into color light of three primary colors, and modulates the white light for each color light, and then synthesizes the modulated color light again to generate image light.

For example, Unexamined Japanese Patent Publication No. 2018-031823 discloses a configuration in which blue light emitted from a light source passes through a wavelength-selective polarized beam splitter element, and the blue light of P-polarized light, which has passed through the wavelength-selective polarized beam splitter element, passes through a quarter wave plate to be converted into circular polarized light. The blue light of the circular polarized light is reflected by a color wheel, and passes through the quarter wave plate again to be converted into S-polarized light. The blue light of the S-polarized light is reflected by the wavelength-selective polarized beam splitter element to travel to a phosphor wheel.

PTL 1 is Unexamined Japanese Patent Publication No. 2018-031823.

SUMMARY

Unfortunately, the technique disclosed in Unexamined Japanese Patent Publication No. 2018-031823 causes a demand for further improving utilization efficiency of light emitted from the light source.

It is an object of the present disclosure to provide a light source device that improves light utilization efficiency and a projection display apparatus.

A light source device according to the present disclosure includes: a light source element configured to emit first light in a first wavelength region; a first selective reflection element disposed at a position where the first light is incident, the first selective reflection element being configured to transmit a component of first linear polarized light, the component being defined by an incident direction and a reflection direction of incident light, and reflect a component of second linear polarized light having a vibration surface orthogonal to a vibration surface of the component of the first linear polarized light; a second selective reflection element disposed at a position for receiving incident light that has passed through or been reflected by the first selective reflection element, the second selective reflection element being configured to transmit or reflect the incident light in accordance with a wavelength region of the incident light; and a first polarization direction conversion element disposed between the first selective reflection element and the second selective reflection element, the first polarization direction conversion element being configured to convert the first linear polarized light having passed through or been reflected by the first selective reflection element into elliptical polarized light. The first polarization direction conversion element converts the elliptical polarized light reflected by the second selective reflection element into the second linear polarized light to be incident on the first polarization direction conversion element again.

Alternatively, a light source device according to the present disclosure includes: a light source element configured to emit first light in a first wavelength region; a first selective reflection element disposed at a position where the first light is incident, the first selective reflection element being configured to transmit or reflect first linear polarized light and reflect or transmit second linear polarized light, the first linear polarized light and the second linear polarized light being defined by an incident direction and a reflection direction of light incident on the first selective element; a second selective reflection element disposed at a position for receiving incident light that has passed through or been reflected by the first selective reflection element, the second selective reflection element being configured to transmit or reflect the incident light in accordance with a wavelength region of the incident light; a wavelength conversion element disposed at a position where the light reflected by or having passed through the first selective reflection element is incident, the wavelength conversion element being configured to convert the light reflected by or having passed through the first selective reflection element into second light in a second wavelength region; a reflection element configured to reflect light reflected by the wavelength conversion element and reflected by or having passed through the first selective reflection element; and a second polarization direction conversion element disposed between the first selective reflection element and the reflection element.

Then, a projection display apparatus according to the present disclosure includes: a light modulator unit that generates image light by using light emitted from a light source device; and a projection optical system that projects the image light.

The present disclosure can provide a light source device that improves utilization efficiency of light, and a projection display apparatus.

DETAILED DESCRIPTION

Hereinafter, exemplary embodiments will be described in detail with reference to the drawings as appropriate. However, details more than necessary may not be described. For example, details of a well-known matter and duplication of a substantially identical configuration will not be described in some cases. This is to avoid unnecessary redundancy of the following description and to facilitate understanding of those skilled in the art.

The accompanying drawings and the following description are provided for those skilled in the art to fully understand the present disclosure, and are not intended to limit the subject matter recited in the claims.

First Exemplary Embodiment

1-1. Configuration of Light Source Device

Figure 1:
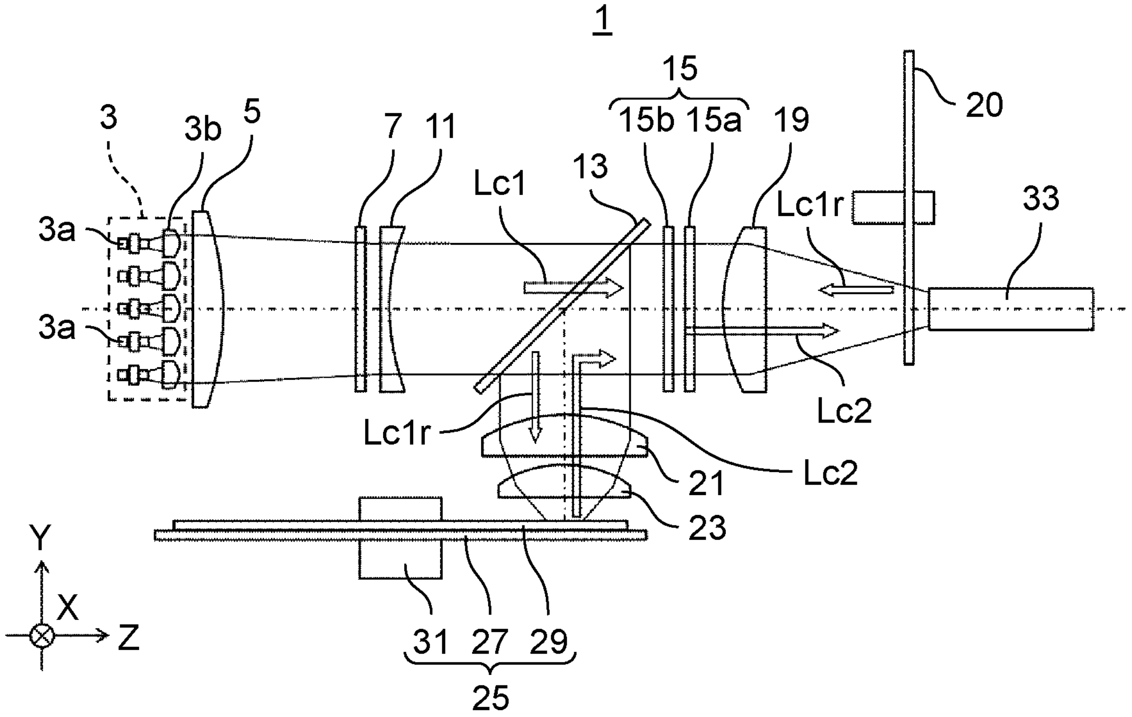
FIG. 1 is a schematic configuration diagram illustrating a configuration example of a light source device according to a first exemplary embodiment.
Figure 2:
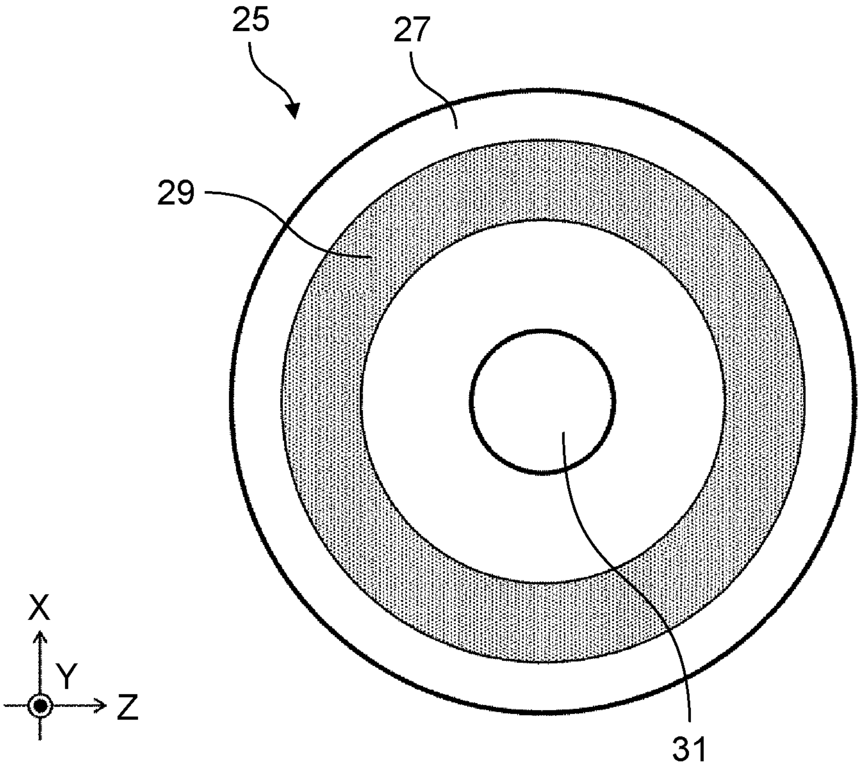
FIG. 2 is a plan view of a wavelength conversion element according to the first exemplary embodiment.
Figure 3:
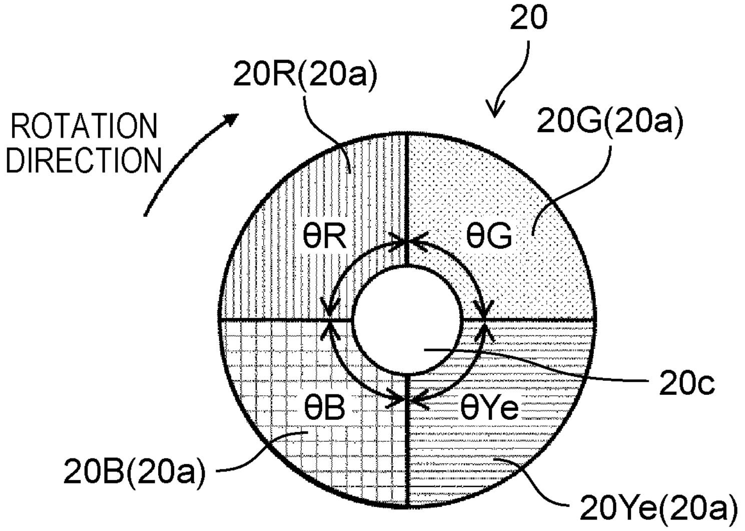
FIG. 3 is a plan view illustrating an example of a color wheel according to the first exemplary embodiment.

With reference to FIGS. 1 to 3, a light source device according to a first exemplary embodiment will be described below. The light source device according to the first exemplary embodiment will be described when used in a projection display apparatus, for example. FIG. 1 is a schematic configuration diagram illustrating a configuration example of a light source device. FIG. 2 is a plan view of a wavelength conversion element. FIG. 3 is a plan view of a color wheel. Each drawing indicates a Z direction in which light is emitted from light source device 1, an XY plane on which first polarization direction conversion element 15 receives light and that is formed in an X direction and a Y direction orthogonal to the X direction, and the XY plane is orthogonal to the Z direction.

Light source device 1 includes light source unit 3, first selective reflection element 13, first polarization direction conversion element 15, color wheel 20, and wavelength conversion element 25. Color wheel 20 is an example of a second selective reflection element. Light source device 1 further includes convex lens 5, diffuser plate 7, and concave lens 11 on an optical path between light source unit 3 and first selective reflection element 13, and condenser lenses 21 and 23 on an optical path between first selective reflection element 13 and wavelength conversion element 25. Light source device 1 further includes light condensing element 19 between first polarization direction conversion element 15 and color wheel 20, and includes rod integrator 33 in a subsequent stage of color wheel 20.

Light source unit 3 includes light source element 3*a* that emits first light Lc1 in a first wavelength region, and collimator lens 3*b* that collimates first light Lc1 emitted from light source element 3*a*. Collimator lens 3*b* is disposed corresponding to light source element 3*a*, and light source unit 3 includes a plurality of sets of light source element 3*a* and collimator lens 3*b*. Light source element 3*a* emits light in a blue wavelength region as light in a first wavelength region, for example. Light source element 3*a* is also a laser light source element in the first exemplary embodiment, for example, and a configuration of light source element 3*a* in which blue light occupied by linear polarized light having a vibration direction mainly in a Y-axis direction is emitted will be described.

Collimated first light Lc1 is incident on convex lens 5 in a subsequent stage to be reduced in width of flux of the light, and is incident on and diffused by diffuser plate 7 to be improved in uniformity of light. First light Lc1 improved in uniformity of light is incident on concave lens 11 in a subsequent stage to be collimated again.

First light Lc1 collimated by concave lens 11 is incident on first selective reflection element 13 disposed at an angle of approximately 45 degrees about an X-axis with respect to an optical axis. First selective reflection element 13 is a dichroic-polarization separation mirror, for example. First selective reflection element 13 transmits first light Lc1 in the first wavelength region emitted from light source element 3*a*, and reflects second light Lc2 that is yellow, for example, and is converted in wavelength by wavelength conversion element 25 using light in a wavelength region identical to the wavelength region of first light Lc1 from light source element 3*a* as excitation light. Thus, first light Lc1 incident on first selective reflection element 13 passes through first selective reflection element 13, and travels straight without changing a traveling direction to be incident on first polarization direction conversion element 15. As described above, first selective reflection element 13 has spectral characteristics of transmitting first light Lc1 that is blue light of P-polarized light with respect to a plane determined by incident light and reflected light, and reflecting blue light of S-polarized light and second light Lc2 to be described later with respect to the plane determined by incident light and reflected light. Second light Lc2 in the second wavelength region is acquired by converting light Lc1*r* in wavelength using wavelength conversion element 25, light Lc1*r* being in the same wavelength region as the wavelength region of first light Lc1.

First polarization direction conversion element 15 converts incident linear polarized light into elliptical polarized light, and converts the incident elliptical polarized light into linear polarized light. First polarization direction conversion element 15 includes two retardation plates such as quarter wave plates, for example, and includes first quarter wave plate 15*a* and second quarter wave plate 15*b* in the present exemplary embodiment. First quarter wave plate 15*a* and second quarter wave plate 15*b* are different in slow axis from each other. For example, first quarter wave plate 15*a* has a slow axis at an angle of 45 degrees with respect to a reference axis, and second quarter wave plate 15*b* has a slow axis at an angle of 90 degrees with respect to the reference axis. Here, the reference axis is the Y-axis on the XY plane illustrated in FIG. 1, for example. The slow axis of first quarter wave plate 15*a* is adjustable for direction with respect to a direction of the slow axis of second quarter wave plate 15*b*.

First light Lc1 incident on first polarization direction conversion element 15 is converted from incident blue light of linear polarized light to blue light of elliptical polarized light. First light Lc1 converted in polarization direction travels straight, and passes through light condensing element 19 to be incident on color wheel 20.

Color wheel 20 includes a plurality of dichroic layers 20*a* formed on a transparent board and motor 20*c* for rotating the transparent board. Dichroic layer 20*a* has four angular regions θR, θG, θB, θYe in a circumferential direction. Dichroic layer 20*a* includes dichroic layer 20R that is formed in angular region θR and transmits red light, dichroic layer 20G that is formed in angular region θG and transmits green light, dichroic layer 20B that is formed in angular region θB and transmits blue light, and dichroic layer 20Ye that is formed in angular region θYe and transmits yellow light.

When yellow light is incident on angular region θR of color wheel 20, only a red component of the yellow light passes through dichroic layer 20R, and light of other color components is reflected and output from color wheel 20 as red light R. When yellow light is incident on angular region θG of color wheel 20, only a green component of the yellow light passes through dichroic layer 20G, and light of other color components is reflected and output from color wheel 20 as green light G. That is, color wheel 20 can transmit or reflect incident light on color wheel 20 in accordance with a wavelength region of the incident light.

When yellow light is incident on angular region θYe of color wheel 20, the yellow light passes through dichroic layer 20Ye to be output from color wheel 20 as yellow light. When blue light is incident on angular region θB of color wheel 20, the blue light passes through dichroic layer 20B to be output from color wheel 20. When yellow light is incident on angular region θB of color wheel 20, the yellow light is reflected. The above configuration allows light source device 1 to emit red light R, green light G, yellow light Ye, and blue light B in a time division manner. Although the configurations of four types of dichroic layer 20*a* different in characteristics have been exemplified here, the present invention is not limited to these configurations, and three types of dichroic layer 20*a* different in characteristics may be provided. Alternatively, dichroic layer 20Ye may have characteristics of reflecting an unnecessary wavelength region in the yellow spectrum.

Light Lc1*r* reflected by color wheel 20 is reflected by first selective reflection element 13 toward wavelength conversion element 25, and passes through condenser lens 21 and condenser lens 23 in a subsequent stage to be condensed on wavelength conversion layer 29 in a ring shape provided in wavelength conversion element 25. Wavelength conversion element 25 is a phosphor wheel, for example.

Wavelength conversion element 25 includes base plate 27, wavelength conversion layer 29 formed on base plate 27, and motor 31 attached to base plate 27. Wavelength conversion element 25 is disposed such that light condensed by condenser lenses 21, 23 is incident on wavelength conversion layer 29 in an annular shape. Wavelength conversion element 25 is rotationally driven by motor 31. Wavelength conversion layer 29 has an incident surface disposed parallel to the XZ plane.

Wavelength conversion layer 29 generates second light Lc2 in the second wavelength region from incident blue light, second light Lc2 being different in wavelength from the incident blue light. For example, wavelength conversion layer 29 is a phosphor layer that is formed using a resin body such as silicone or alumina or an inorganic substance as a binder and contains internally a plurality of phosphor particles.

The phosphor particles of wavelength conversion layer 29 emit second light Lc2 in a wavelength region longer than a wavelength region of the blue light received. For example, the phosphor of wavelength conversion layer 29 is a Ce-activated YAG-based yellow phosphor that is excited by blue color light received to emit yellow light containing wavelength components of green light and red light. The phosphor particles each include a crystalline matrix with a chemical composition that is typically $Y_3Al_5O_{12}$.

Between base plate 27 and wavelength conversion layer 29, a reflection layer that reflects incident light Lc1*r* and second light Lc2 generated in wavelength conversion layer 29 may be disposed. This structure enables second light Lc2 traveling toward base plate 27 in wavelength conversion layer 29 to travel toward first selective reflection element 13, so that conversion efficiency of fluorescent light can be improved.

As described above, light Lc1*r*, which is the blue light condensed on wavelength conversion layer 29 of wavelength conversion element 25 by condenser lenses 21 and 23, is not only converted in wavelength into fluorescent light, but also incident on condenser lenses 21, 23 again in this order with a traveling direction of light changed by 180 degrees to be collimated. Second light Lc2 being fluorescent light is in a yellow wavelength region, for example, and constitutes white light in combination with blue light emitted from light source element 3*a*.

Second light Lc2 output from condenser lens 21 and collimated is incident on first selective reflection element 13. As described above, first selective reflection element 13 has characteristics of reflecting light in the wavelength region of second light Lc2, and thus changes the traveling direction of the light by 90 degrees. Second light Lc2 with the traveling direction changed by 90 degrees by first selective reflection element 13 passes through first polarization direction conversion element 15 in a subsequent stage to be incident on light condensing element 19.

For example, light condensing element 19 is a condenser lens, and is disposed at a position for receiving light guided in the third direction. Light condensing element 19 has a subsequent stage in which rod integrator 33 is disposed, and light condensing element 19 condenses incident light on rod integrator 33.

The light passing through first polarization direction conversion element 15 and second light Lc2 from wavelength conversion element 25 are incident on and condensed by light condensing element 19. Then, each light passing through color wheel 20 is incident on rod integrator 33 with an incident end disposed at a substantially light condensing position of light condensing element 19. The light having flux uniformed by rod integrator 33 is output from an emission end of rod integrator 33.

Figure 4A:
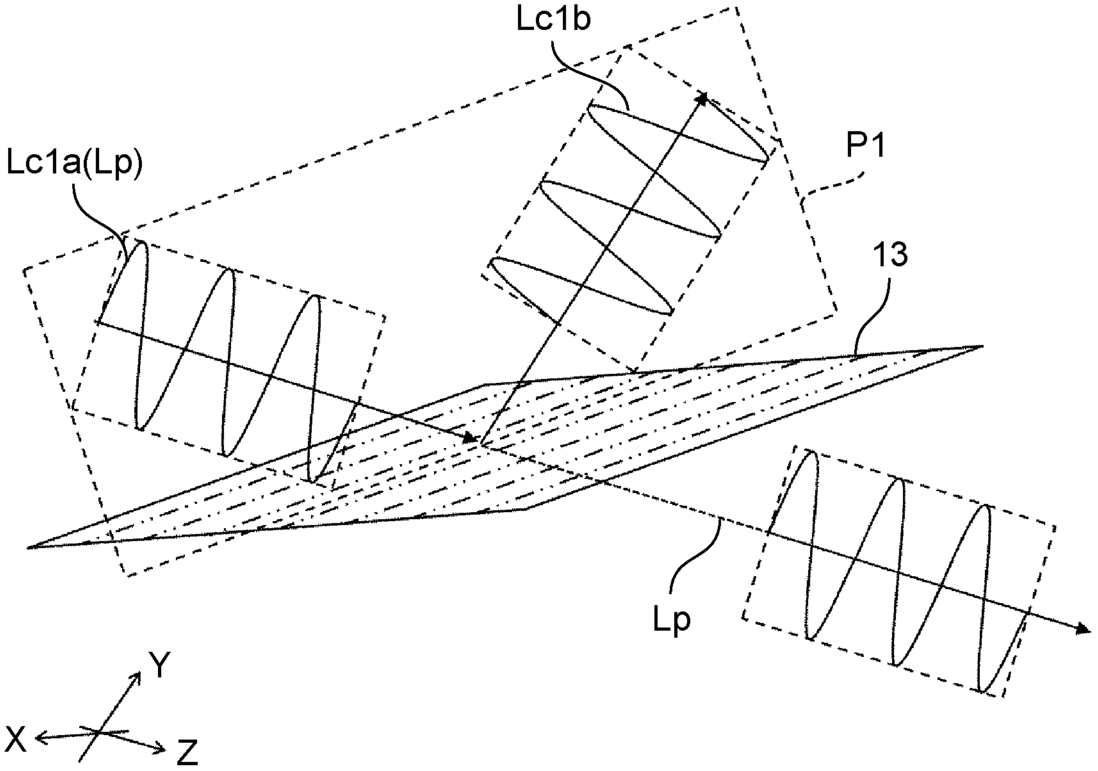
FIG. 4A is an explanatory diagram for illustrating P-polarized light on a first selective reflection element.
Figure 5A:
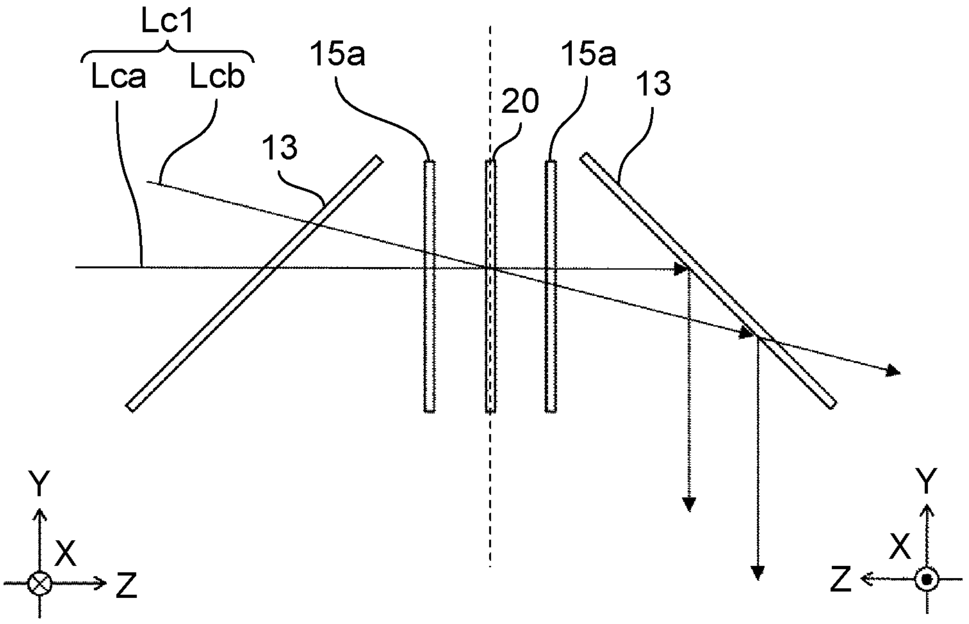
FIG. 5A is an explanatory diagram for illustrating an optical path from incidence to re-incidence on a first selective reflection element in a comparative example.
Figure 5B:
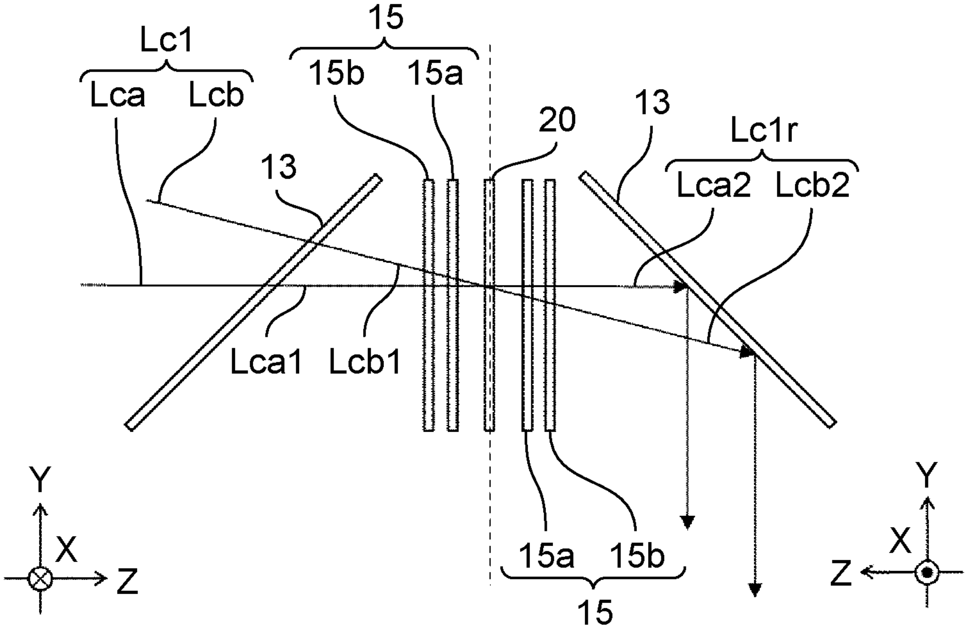
FIG. 5B is an explanatory diagram for illustrating an optical path from incidence to re-incidence on a first selective reflection element in the first exemplary embodiment.
Figure 6:
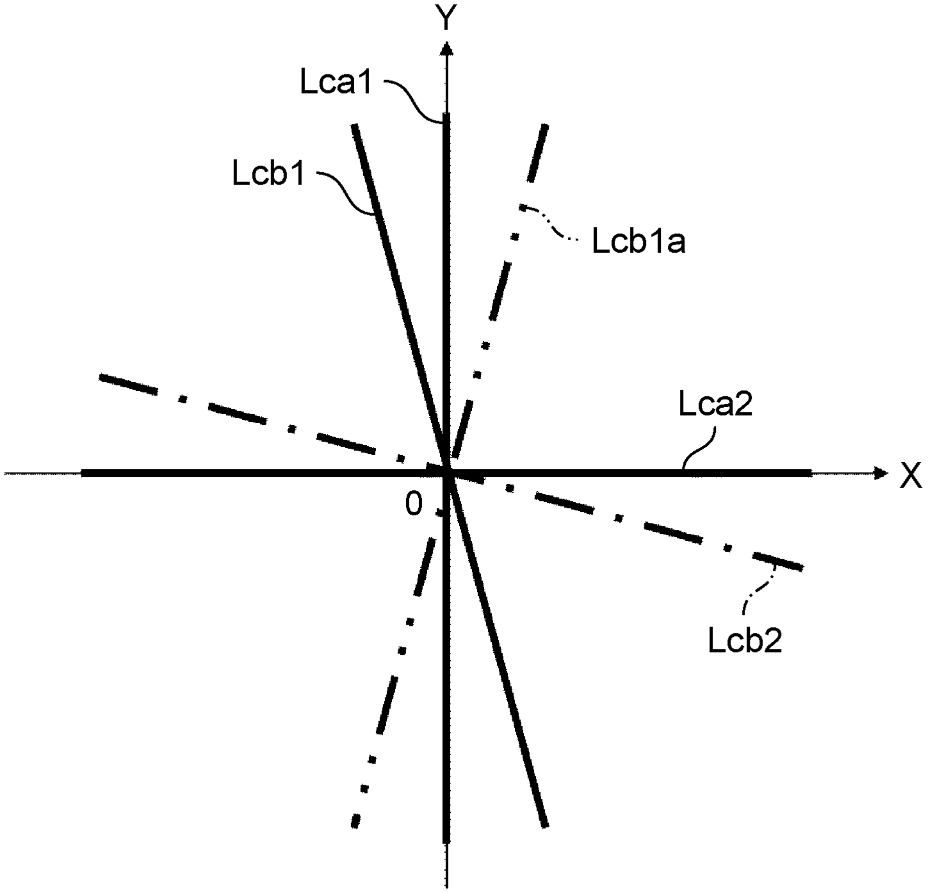
FIG. 6 is an explanatory diagram illustrating an example of a state of linear polarized light.

1-2. Configuration of First Selective Reflection Element and First Polarization Direction Conversion Element With reference to FIGS. 4A to 6, configurations of the first selective reflection element and the first polarization direction conversion element will be described. FIG. 4C is an explanatory view for illustrating an optical path of light obliquely incident and re-incident on first selective reflection element 13. FIG. 5A is an explanatory diagram for illustrating an optical path from incidence to re-incidence on first selective reflection element 13 in a comparative example. FIG. 5B is an explanatory diagram for illustrating an optical path from incidence to re-incidence on first selective reflection element 13 in the first exemplary embodiment. FIG. 6 is an explanatory diagram illustrating an example of a state of linear polarized light.

Here, the P-polarized light and the S-polarized light for first selective reflection element 13 will be described. As illustrated in FIG. 4A, P-polarized light Lp is a component of first light Lc1 incident on first selective reflection element 13, the component having a vibration plane parallel to plane P1 determined by incident light Lc1*a* on first selective reflection element 13 and reflected light Lc1*b* from first selective reflection element 13. First selective reflection element 13 is disposed with its polarization axis parallel to the vibration plane of P-polarized light Lp component of first light Lc1 traveling on the optical axis, so that most of P-polarized light Lp component of first light Lc1 incident on first selective reflection element 13 passes through first selective reflection element 13. First light Lc1 having passed through first selective reflection element 13, or the vibration plane of P-polarized light Lp, is parallel to plane P1.

Figure 4B:
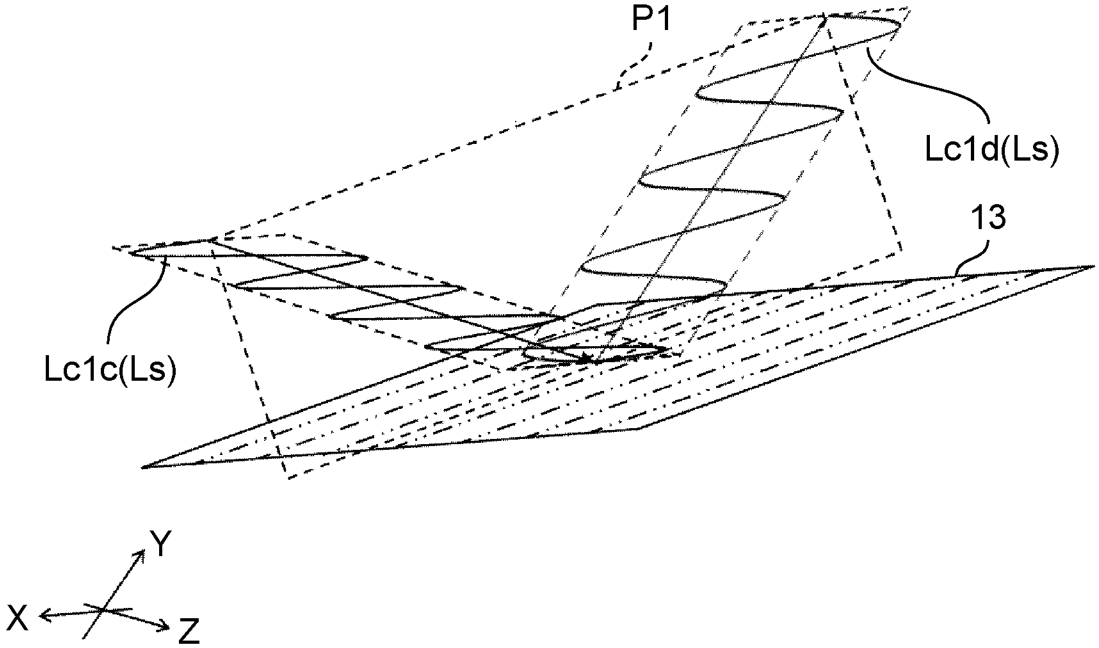
FIG. 4B is an explanatory diagram for illustrating S-polarized light on a first selective reflection element.
Figure 4C:
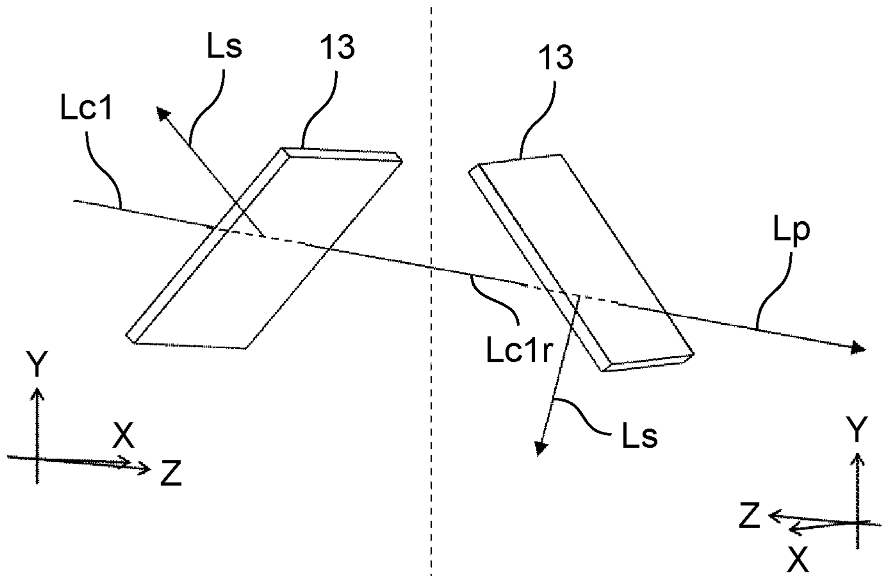
FIG. 4C is an explanatory view for illustrating an optical path of light obliquely incident and re-incident on a first selective reflection element.

As illustrated in FIG. 4B, S-polarized light is a component of first light Lc1, the component having a vibration plane of an electric field perpendicular to plane P1 determined by incident light Lc1*c* on first selective reflection element 13 and reflected light Lc1*d* from first selective reflection element 13. Most of S-polarized light component Ls of first light Lc1 is reflected by first selective reflection element 13.

Although light source element 3*a* is disposed such that a vibration plane of light passing through the optical axis of first light Lc1 emitted from light source unit 3 passes through the polarization axis (transmission axis) of first selective reflection element 13, first light Lc1 emitted from light source unit 3 has a certain range of an angle of the vibration plane. Thus, P-polarized light Lp component having passed through first selective reflection element 13 includes the vibration plane that is not necessarily aligned with the polarization axis of first selective reflection element 13 depending on an incident direction of first light Lc1. As described above, the vibration plane of P-polarized component Lp1 of first light Lc1 having passed through first selective reflection element 13 varies depending on a direction of incident light.

As illustrated in FIG. 4C, when first light Lc1, which is linear polarized blue light in the Y-axis direction, is incident on first selective reflection element 13 at the first incidence from light source unit 3, for example, flux of first light Lc1 incident on first selective reflection element 13 at an angle with respect to the optical axis includes a component of S-polarized light Ls perpendicular to incident and output surfaces determined by incident light and reflected light, respectively, so that a part of the amount of light is reflected by first selective reflection element 13.

Although FIG. 4C does not illustrate first polarization direction conversion element 15, light condensing element 19, and color wheel 20, when light having passed through first selective reflection element 13 is reflected by color wheel 20, and is incident on first selective reflection element 13 again at the second incidence, a direction of the reflected light is different from that at the first incident. Thus, the incident and output surfaces determined by the incident light and the reflected light, respectively, are different, so that light having passed through first selective reflection element 13 is not completely converted into the S-polarized light at the second incidence only with one quarter wave plate, thereby allowing a P-polarized component to pass through first selective reflection element 13. As described above, light incident on first polarization direction conversion element 15 while deviating from the optical axis has the amount of light passing through first selective reflection element 13 at the second incidence, the amount of light causing decrease in light utilization efficiency.

As illustrated in FIG. 1, first light Lc1 includes a light beam that is not parallel to the Z-axis (optical axis) and has incident and output surfaces that do not coincide between the first incidence and the second incidence of blue light on first selective reflection element 13 (see FIG. 4C), and thus, P-polarized light and S-polarized light are different in direction from each other depending on an angle of incident light. P-polarized light (S-polarized light) at the first incidence on first selective reflection element 13 and P-polarized light (S-polarized light) at the second incidence thereon have respective polarization directions that are substantially symmetric with respect to the Y-axis.

First light Lc1 includes light Lca traveling along the optical axis and light Lcb traveling obliquely with respect to the optical axis that have a difference in transmission and reflection conditions of first selective reflection element 13, and the difference will be described next. FIG. 5A illustrates a comparative example in which first polarization direction conversion element 15 includes only one first quarter wave plate 15*a*. First polarization direction conversion element 15 is disposed with a slow axis forming an angle of 45 degrees with respect to the Y-axis. Thus, first light Lcb inclined with respect to the optical axis causes second incident light on first selective reflection element 13, or light converted from P-polarized light at the first incidence to S-polarized light with a polarization direction turned by 90 degrees, to include the P-polarized component. For this reason, the incident light at the second incidence on first selective reflection element 13 may include a component that passes through first selective reflection element 13 and returns to light source unit 3.

Thus, as illustrated in FIGS. 1 and 5B, first polarization direction conversion element 15 of the present exemplary embodiment including first quarter wave plate 15*a* and second quarter wave plate 15*b* whose slow axes do not coincide with each other enables a polarization direction at the second incidence on first selective reflection element 13 to further coincide with a S polarization direction at the second incidence. In this manner, first polarization direction conversion element 15 converts linear polarized light and elliptical polarized light to each other.

First light Lc1 includes light Lcb that is obliquely incident on first selective reflection element 13 with respect to the optical axis. As illustrated in FIG. 6, light Lcb1 that is linear polarized light of light Lcb having passed through first selective reflection element 13 is inclined with respect to the Y-axis. When light Lcb1 is incident on first selective reflection element 13 again, the light is to be reflected toward wavelength conversion element 25. At this time, S-polarized light reflected by first selective reflection element 13 is to be required to have a vibration plane of light Lcb2. The vibration plane of light Lcb2 is obtained by further rotating a vibration plane of light Lcb1*a* by 90 degrees, the vibration plane being obtained by converting a vibration plane of light Lcb1 in Y-axis symmetry.

Light Lca travels along the optical axis and passes through first selective reflection element 13 to be linearly polarized to serve as light Lca1 having a vibration plane along the Y-axis. Thus, when light Lca1 is incident on first selective reflection element 13 again, S-polarized light reflected toward wavelength conversion element 25 serves as light Lca2 having a vibration plane on the X-axis.

First quarter wave plate 15*a* and second quarter wave plate 15*b* are disposed between first selective reflection element 13 and color wheel 20. First quarter wave plate 15*a* is disposed with a slow axis forming an angle of 45 degrees with respect to the Y-axis. When first quarter wave plate 15*a* is used alone, as in the comparative example of FIG. 5A, the linear polarized light incident on the optical axis to be incident on first quarter wave plate 15*a* (P-polarized light at the first incidence on first selective reflection element 13) is converted into circular polarized light, and the circular polarized light reflected by color wheel 20 and being incident on first quarter wave plate 15*a* again is converted into linear polarized light (S-polarized light at the first incident on first selective reflection element 13) acquired by rotating the circular polarized light by 90 degrees.

Second quarter wave plate 15*b* is disposed with a slow axis parallel or orthogonal to the Y-axis. When second quarter wave plate 15*b* is used alone, linear polarized light (P-polarized light at the first incidence on first selective reflection element 13) with a polarization direction inclined with respect to the Y-axis (slow axis) is converted into elliptical polarized light with a major axis coinciding with the slow axis regardless of the inclination. The elliptical polarized light. reflected by color wheel 20 and incident on second quarter wave plate 15*b* again is converted into linear polarized light with a polarization direction inclined at an angle (symmetry) opposite to that at the first incidence with respect to the Y-axis (slow axis), the polarization direction substantially coinciding with a polarization direction of the P-polarized light at the second incidence on first selective reflection element 13. When the linear polarized light is further rotated by 90 degrees, the linear polarized light becomes S-polarized light at the second incidence.

As a result, when first quarter wave plate 15*a* and second quarter wave plate 15*b* are used in combination, effects of both are combined. Thus, the polarization direction at the second incidence on first selective reflection element 13 substantially coincides with the S polarization direction at the second incidence. Thus, a P-polarized light component that passes through first selective reflection element 13 and returns to light source unit 3 can be reduced. Then, blue light reflected by first selective reflection element 13 can be prevented from being reduced, and the amount of fluorescent light converted by wavelength conversion element 25 can be prevented from being reduced.

First light Lc1 emitted from light source element 3*a* passes first quarter wave plate 15*a* and second quarter wave plate 15*b* to be converted from blue light of P-polarized light (P-polarized light on a first incident surface of first selective reflection element 13) to blue light of elliptical polarized light. First light Lc1 converted into blue light of the elliptical polarized light is reflected by color wheel 20. Light Lc1*r* reflected by color wheel 20 passes through first quarter wave plate 15*a* and second quarter wave plate 15*b* again to be converted from the blue light of the elliptical polarized light to blue light of S-polarized light. The converted blue light of the S-polarized light (S-polarized light on a second incident surface of first selective reflection element 13) is reflected by first selective reflection element 13 and travels to wavelength conversion element 25. Although the example has been described here in which the P-polarized light is converted into the S-polarized light, a similar configuration can be applied even when the S-polarized light is converted into the P-polarized light.

1-3. Effects and the Like

As described above, light source device 1 according to the first exemplary embodiment includes: light source element 3*a* configured to emit first light Lc1 that is blue light; first selective reflection element 13 disposed at a position where first light Lc1 is incident, first selective reflection element 13 being configured to transmit incident first linear polarized light, and reflect second linear polarized light perpendicular to the first linear polarized light; color wheel 20 disposed at a position for receiving light having passed through first selective reflection element 13, color wheel 20 being configured to transmit or reflect incident light in accordance with its wavelength region; and first polarization direction conversion element 15 disposed between first selective reflection element 13 and color wheel 20, first polarization direction conversion element 15 being configured to convert the first linear polarized light having passed through first selective reflection element 13 into elliptical polarized light. First polarization direction conversion element 15 converts the elliptical polarized light, which is reflected by color wheel 20 and incident on first polarization direction conversion element 15 again, into second linear polarized light.

Converting the first linear polarized light into the elliptical polarized light enables the elliptical polarized light reflected by color wheel 20 to be converted into the second linear polarized light that can be reflected by first selective reflection element 13. As a result, light that is not reflected by first selective reflection element 13 can be reduced, and thus utilization efficiency of light of light source device 1 can be improved.

The first linear polarized light is any one of P-polarized light and S-polarized light, and the second linear polarized light is the other of the P-polarized light and the S-polarized light. First polarization direction conversion element 15 converts first linear polarized light incident parallel to the optical axis into circular polarized light, and converts a component of the first linear polarized light incident at an angle with respect to the optical axis into elliptical polarized light other than the circular polarized light, and then converts the circular polarized light and the elliptical polarized light reflected by color wheel 20 and incident on first polarization direction conversion element 15 again into second linear polarized light.

As a result, both of the first linear polarized light incident parallel to the optical axis and the first linear polarized light incident at an angle with respect to the optical axis can be converted into the second linear polarized light, so that utilization efficiency of light can be improved.

In other words, the light utilization efficiency can be improved by converting the first linear polarized light obliquely having passed through first selective reflection element 13 with a first transmission axis into the elliptical polarized light that is to be converted into the second linear polarized light reflected by the first selective reflection element 13 with a second transmission axis on the optical path, the second transmission axis being disposed in mirror symmetry of the first transmission axis.

Although first selective reflection element 13 in the first exemplary embodiment illustrated in FIG. 1 is disposed at an angle of approximately 45 degrees about an x-axis with respect to the optical axis, the angle of first selective reflection element 13 with respect to the optical axis may be different from approximately 45 degrees to maximize the spectral characteristics of first selective reflection element 13. In this case, other components may be disposed in accordance with the angle. Although the first exemplary embodiment has been described in which light emitted from light source element 3*a* is P-polarized light, a similar configuration can be applied even for emitted light of S-polarized light.

First polarization direction conversion element 15 includes two quarter wave plates different in slow axis, but may include only one wave plate. First polarization direction conversion element 15 including two quarter wave plates different in slow axis enables conversion of light to linear polarized light to be more appropriately performed even when first selective reflection element 13 deviates from the optical axis. Alternatively, first polarization direction conversion element 15 may include three or more wave plates different in slow axis.

Figure 7:
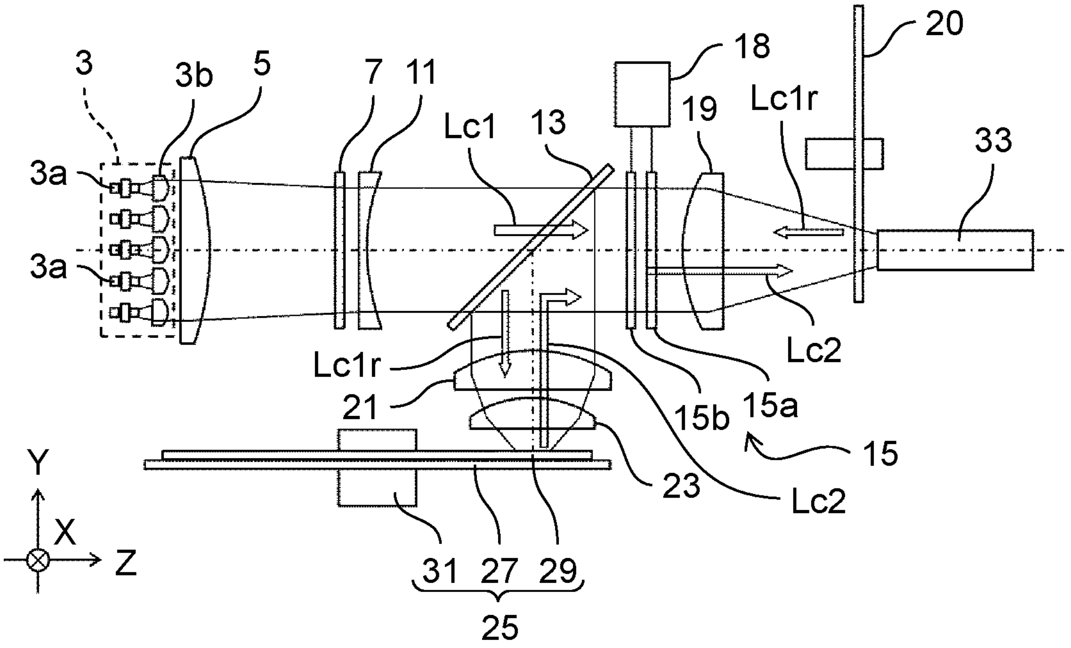
FIG. 7 is a schematic configuration diagram illustrating a configuration example of a light source device according to a modification of the first exemplary embodiment.

Next, light source device 1A as a modification of light source device 1 of the first exemplary embodiment will be described with reference to FIG. 7. Light source device 1A has a configuration in which first polarization direction conversion element 15 of light source device 1 is rotatable. Light source device 1 of the first exemplary embodiment and light source device 1A of the modification are common in configuration other than the point above and the point described below.

Light source device 1A includes rotation mechanism 18 (an example of a rotation drive unit) that rotates first polarization direction conversion element 15. Rotation mechanism 18 includes a motor and a gear mechanism, for example. Rotation mechanism 18 may individually rotate first quarter wave plate 15*a* and second quarter wave plate 15*b*, or may rotate only one of them. Rotation mechanism 18 can adjust the slow axis of first polarization direction conversion element 15, so that an optimum linear polarization direction for first selective reflection element 13 can be set. Rotation mechanism 18 can be operated by a user.

Thus, light source device 1A enables conversion from P-polarized light to S-polarized light by rotationally adjusting first quarter wave plate 15*a* and second quarter wave plate 15*b* even when first selective reflection element 13 deviates from linear polarized light incident from light source element 3*a*, so that utilization efficiency of light can be improved.

Although light having passed through first selective reflection element 13 is used by causing color wheel 20 to transmit and reflect the light in the first exemplary embodiment, the present invention is not limited thereto. As a modification, light reflected by first selective reflection element 13 may be used by causing color wheel 20 to transmit and reflect the light. In this case, color wheel 20 is disposed at a position for receiving the light reflected by first selective reflection element 13. First polarization direction conversion element 15 is disposed between first selective reflection element 13 and color wheel 20 to convert first linear polarized light reflected by first selective reflection element 13 into elliptical polarized light.

Second Exemplary Embodiment

Figure 8:
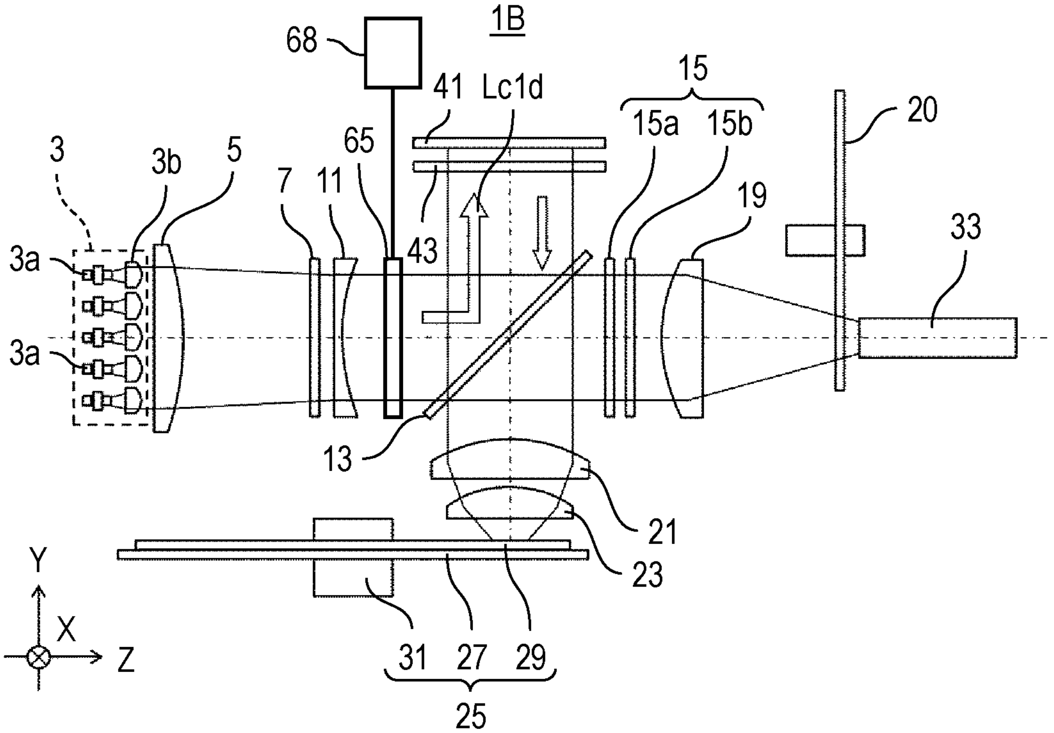
FIG. 8 is a schematic configuration diagram illustrating a configuration example of a light source device according to a second exemplary embodiment.

Next, light source device 1B according to a second exemplary embodiment will be described with reference to FIG. 8. FIG. 8 is a schematic configuration diagram illustrating a configuration example of a light source device according to the second exemplary embodiment. Light source device 1B of the second exemplary embodiment includes reflection element 41 and second polarization direction conversion element 43 in light source device 1 of the first exemplary embodiment. Light source device 1B of the second exemplary embodiment and light source device 1 of the first exemplary embodiment are common in configuration other than the point above and the point described below.

Reflection element 41 reflects light, which is reflected by first selective reflection element 13 and travels in a direction opposite to wavelength conversion element 25, toward first selective reflection element 13. Reflection element 41 is a reflection mirror, for example.

Second polarization direction conversion element 43 is disposed between first selective reflection element 13 and reflection element 41. Second polarization direction conversion element 43 is, a quarter wave plate with a slow axis of 45 degrees, for example. As illustrated in FIG. 4C, first light Lc1 reflected by first selective reflection element 13 toward reflection element 41 includes S-polarized light Ls that is converted from S-polarized light to elliptical polarized light by second polarization direction conversion element 43. The light converted into the elliptical polarized light is reflected by reflection element 41 and passes through second polarization direction conversion element 43 again. At this time, the elliptical polarized light reflected by reflection element 41 is converted into P-polarized light.

The light converted into the P-polarized light passes through first selective reflection element 13 and is incident on wavelength conversion element 25. As a result, a part of blue light of first light Lc1 reflected by first selective reflection element 13 in the direction opposite to wavelength conversion element 25 can also be converted into yellow light, so that utilization efficiency of light can be improved. For example, second polarization direction conversion element 43 may include at least two quarter wave plates. The at least two quarter wave plates are different in slow axis. At least one of the at least two quarter wave plates is adjustable for direction of the slow axis. As described above, when at least one of the at least two quarter wave plates is adjusted for direction of the slow axis with respect to another quarter wave plate, light passing through second polarization direction conversion element 43 can be polarized in an identical direction. That is, the light can be polarized in an identical direction more reliably when two or more quarter wave plates are used as compared with when only one quarter wave plate is used. As a result, light source device 1B can be further improved in utilization efficiency of light. For example, one of the quarter wave plates of second polarization direction conversion element 43 has a slow axis at an angle of 45 degrees with respect to a reference axis, and the other of the quarter wave plates has a slow axis at an angle of 90 degrees with respect to the reference axis. Here, the reference axis is the X-axis on the XZ plane illustrated in FIG. 8, for example.

Dichroic layer 20B of color wheel 20 may include a region through which a part of second light Lc2 passes, second light Lc2 being fluorescent light converted by wavelength conversion layer 29.

Light source device 1B further includes half wave plate 65 and rotation mechanism 68 (an example of the rotation drive unit). half wave plate 65 is disposed between concave lens 11 and first selective reflection element 13, and is configured to be rotatable. Alternatively, half wave plate 65 can also be disposed between convex lens 5 and concave lens 11. That is, half wave plate 65 is disposed between light source element 3*a* and first selective reflection element 13.

Rotation mechanism 68 is connected to half wave plate 65 and is configured to rotate half wave plate 65. Rotation mechanism 68 has a configuration similar to that of rotation mechanism 18 (see FIG. 7).

Rotating half wave plate 65 enables adjustment of a ratio between P-polarized light and S-polarized light in light having passed through half wave plate 65 and incident on first selective reflection element 13. Adjusting the ratio between P-polarized light and S-polarized light enables adjustment of a ratio between light passing through first selective reflection element 13 and light reflected by first selective reflection element 13. As a result, a ratio between blue and yellow of light incident on rod integrator 33 through color wheel 20. That is, only rotating half wave plate 65 enables adjustment of the ratio between blue and yellow without changing a configuration behind first selective reflection element 13.

The above configuration enables a manufacturer of light source device 1B to adjust color of light to be emitted from light source device 1B by rotating half wave plate 65 using rotation mechanism 68. Then, even when light emitted by light source device 1B has changed in color with time due to long-term use of light source device 1B, the user of light source device 1B can re-adjust the color to original color of light by rotating half wave plate 65. The user of light source device 1B further can intentionally change color of light to be emitted from light source device 1B to a desired color by rotating half wave plate 65.

Light source device 1B does not necessarily require half wave plate 65 and rotation mechanism 68. That is, light source device 1B may not include half wave plate 65 and rotation mechanism 68. When light source device 1B does not include half wave plate 65 and rotation mechanism 68, a decrease in light efficiency due to absorption of light with half wave plate 65 can be prevented, and cost also can be reduced.

Third Exemplary Embodiment

Figure 9:
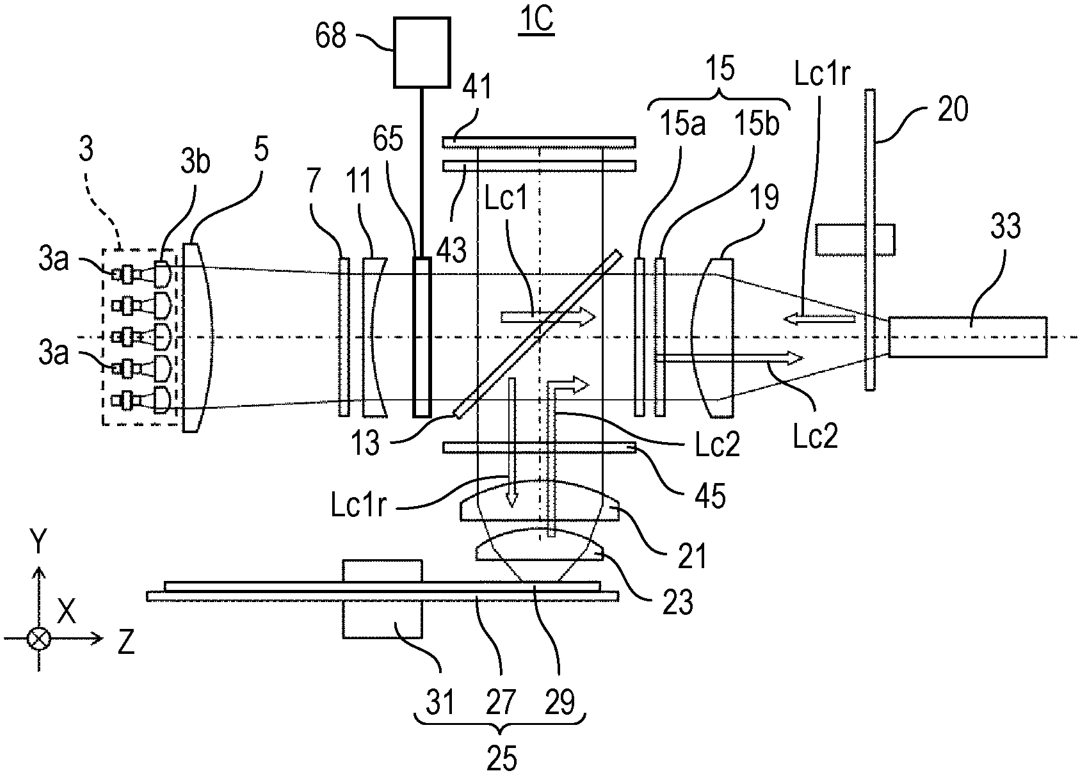
FIG. 9 is a schematic configuration diagram illustrating a configuration example of a light source device according to a third exemplary embodiment.

Next, light source device 1C according to a third exemplary embodiment will be described with reference to FIG. 9. FIG. 9 is a schematic configuration diagram illustrating a configuration example of the light source device according to the third exemplary embodiment. Light source device 1C of the third exemplary embodiment further includes third polarization direction conversion element 45 disposed between wavelength conversion element 25 and first selective reflection element 13 in light source device 1B of the second exemplary embodiment. An example of third polarization direction conversion element 45 is a quarter wave plate. Light source device 1C of the third exemplary embodiment and light source device 1B of the second exemplary embodiment are common in configuration other than the point above and the point described below.

First polarization direction conversion element 15 converts light Lc1*r* into S-polarized light, and first selective reflection element 13 reflects this light toward wavelength conversion element 25. Third polarization direction conversion element 45 converts blue light reflected by first selective reflection element 13 from S-polarized light on first selective reflection element 13 into elliptical polarized light. The blue light converted into the elliptical polarized light is converted from the blue light to yellow light by wavelength conversion element 25. Here, the blue light of the elliptical polarized light that has not been converted into the yellow light is reflected by wavelength conversion element 25, and passes through third polarization direction conversion element 45 again to be converted from the elliptical polarized light into P-polarized light that can pass through first selective reflection element 13. The light converted into the P-polarized light and output from third polarization direction conversion element 45 passes through first selective reflection element 13 to pass through second polarization direction conversion element 43. Second polarization direction conversion element 43 is, a quarter wave plate with a slow axis at an angle of 45 degrees, for example, so that the blue light having passed through second polarization direction conversion element 43 is converted from P-polarized light that can pass through first selective reflection element 13 into elliptical polarized light. The blue light converted into the elliptical polarized light is reflected by reflection element 41 and is incident on second polarization direction conversion element 43 again.

The blue light incident on second polarization direction conversion element 43 again is converted from the elliptical polarized light into blue light of P-polarized that can pass through first selective reflection element 13. The blue light converted into the P-polarized light on first selective reflection element 13 passes through first selective reflection element 13 and third polarization direction conversion element 45 to be incident on wavelength conversion element 25.

As a result, light reflected by wavelength conversion element 25 without being converted from blue to yellow can be reflected by reflection element 41 to be incident on wavelength conversion element 25 again. Thus, the light can be converted from blue into yellow again, so that utilization efficiency of light can be improved. For example, third polarization direction conversion element 45 may include at least two quarter wave plates. The at least two quarter wave plates are different in slow axis. At least one of the at least two quarter wave plates is adjustable for direction of the slow axis. As described above, when at least one of the at least two quarter wave plates is adjusted for direction of the slow axis with respect to another quarter wave plate, light passing through third polarization direction conversion element 45 can be polarized in an identical direction. That is, the light can be polarized in an identical direction more reliably when two or more quarter wave plates are used as compared with when only one quarter wave plate is used. As a result, light source device 1C can be further improved in utilization efficiency of light. For example, one of the quarter wave plates of third polarization direction conversion element 45 has a slow axis at an angle of 45 degrees with respect to a reference axis, and the other of the quarter wave plates has a slow axis at an angle of 90 degrees with respect to the reference axis. Here, the reference axis is the X-axis on the XZ plane illustrated in FIG. 9, for example.

Fourth Exemplary Embodiment

Figure 10:
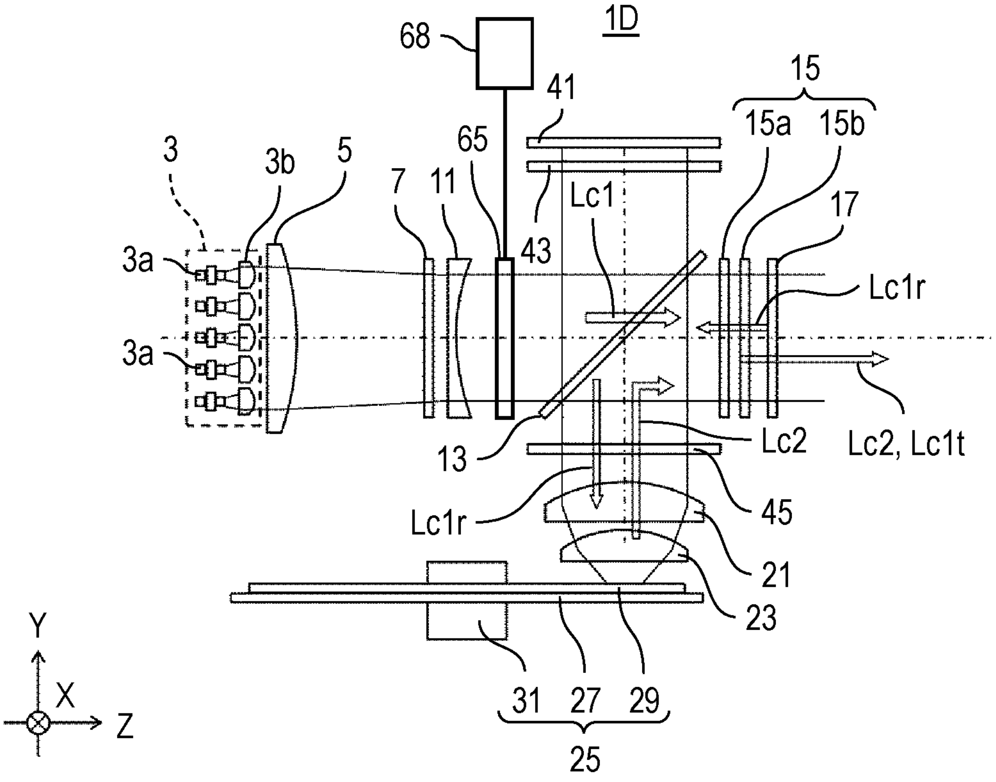
FIG. 10 is a schematic configuration diagram illustrating a configuration example of a light source device according to a fourth exemplary embodiment.

Next, light source device 1D according to a fourth exemplary embodiment will be described with reference to FIG. 10. FIG. 10 is a schematic configuration diagram illustrating a configuration example of the light source device according to the fourth exemplary embodiment. Light source device 1D of the fourth exemplary embodiment includes selective reflection element 17 instead of color wheel 20 in light source device 1C of the third exemplary embodiment. Light source device 1D of the fourth exemplary embodiment and light source device 1C of the third exemplary embodiment are common in configuration other than the point above and the point described below.

Light source device 1D of the fourth exemplary embodiment is a light source device for a projection display apparatus of a three-chip liquid crystal system, for example. Selective reflection element 17 is disposed between first polarization direction conversion element 15 and light condensing element 19.

Selective reflection element 17 reflects a part of first light Lc1 and transmits the rest of first light Lc1, so that first light Lc1 is separated into light Lc1*r* to be converted into fluorescent light later and Lc1*t* to be output as blue light, and transmits second light Lc2 of yellow. Selective reflection element 17 is a single dichroic mirror, for example.

For example, selective reflection element 17 has a reflectance of 70% or more of first light Lc1, and a transmittance of 95% or more of second light Lc2. Selective reflection element 17 has a surface on which a dielectric layer is uniformly formed to achieve a uniform transmittance of first light Lc1. First light Lc1 having passed through selective reflection element 17 is incident on light condensing element 19 (see FIG. 12).

Light Lc1*r*, which is a part of first light Lc1 reflected by selective reflection element 17, passes through the first polarization direction conversion element 15 and converted from elliptical polarized light to blue light of S-polarized light to be reflected by first selective reflection element 13. Light Lc1*r*, which is the blue light of the S-polarized light, is changed in its traveling direction by 90 degrees by first selective reflection element 13 to be reflected toward wavelength conversion element 25, and is converted into second light Lc2, which is yellow light, by wavelength conversion element 25.

Light source device 1D of the fourth exemplary embodiment enables emitting blue light and yellow light simultaneously, and thus enables improving utilization efficiency of light as with light source device 1C of the third exemplary embodiment.

Fifth Exemplary Embodiment

Figure 11:
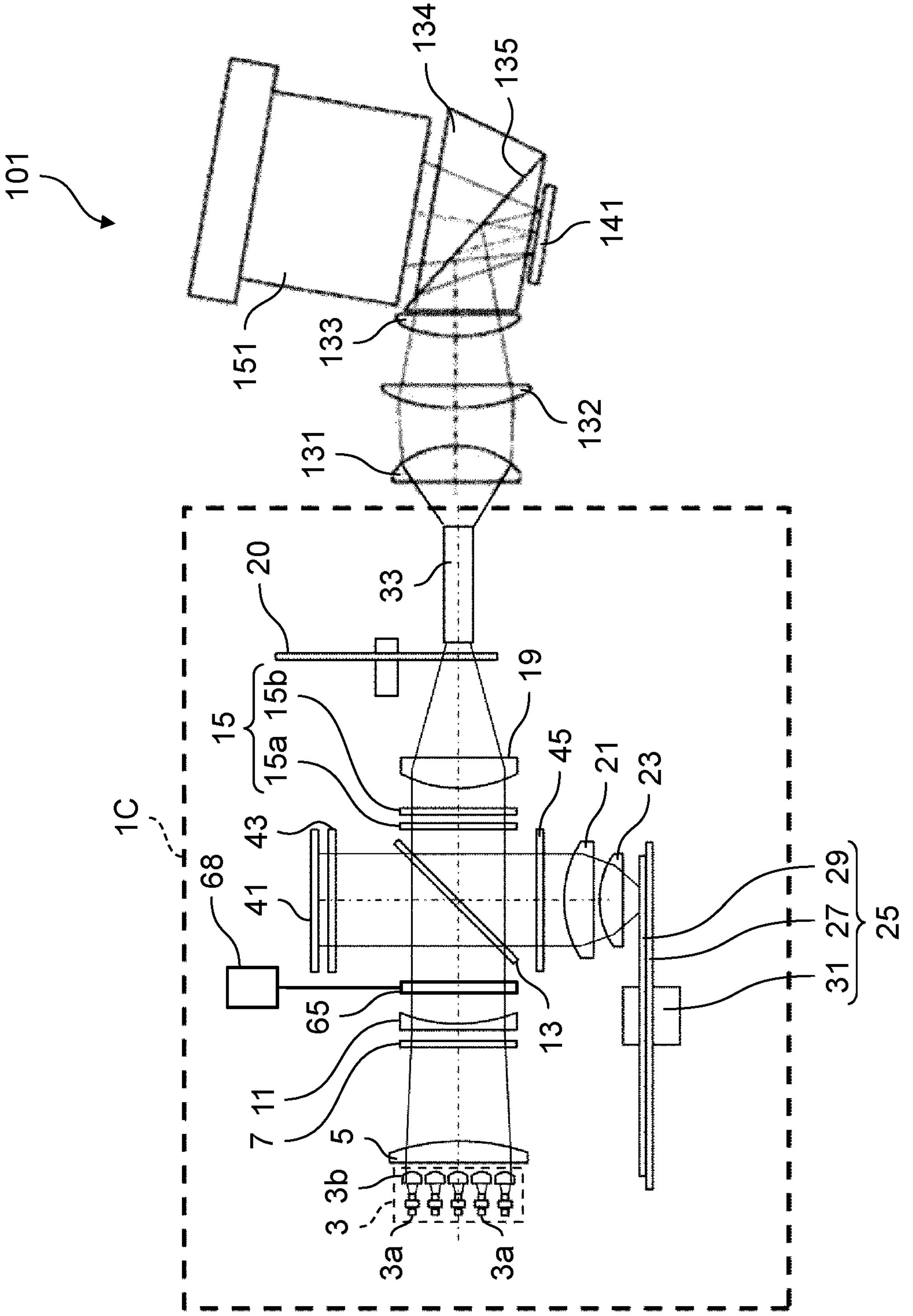
FIG. 11 is a diagram illustrating a configuration of a projection display apparatus according to a fifth exemplary embodiment.

Next, projection display apparatus 101 of a fifth exemplary embodiment will be described with reference to FIG. 11. FIG. 11 is a diagram illustrating a configuration of projection display apparatus 101 according to the fifth exemplary embodiment. As illustrated in FIG. 11, projection display apparatus 101 of the fifth exemplary embodiment is a projection display apparatus of a one-chip DLP system, for example. Projection display apparatus 101 includes light source device 1C.

Light output from rod integrator 33 is imaged to DMD 141 described later through a relay lens system including convex lenses 131, 132, 133.

The light having passed through convex lenses 131, 132, 133 to be incident on total reflection prism 134 is incident on small air gap 135 of total reflection prism 134 at an angle equal to or larger than an angle of total reflection, and is reflected to be changed in direction of traveling of light and is incident on DMD 141.

DMD 141 changes a direction of a micromirror to change a traveling direction of light in response to a signal from an image circuit (not illustrated), the signal being synchronized with color light received from color wheel 20, and outputs the light.

The light changed in direction of traveling by DMD 141 in response to an image signal is incident on total reflection prism 134 and incident on small air gap 135 of total reflection prism 134 at an angle less than or equal to the angle of total reflection. Then, the light directly passes through small air gap 135 to be incident on projection lens unit 151 serving as a projection optical system, and is projected on a screen (not illustrated).

Projection display apparatus 101 of the fifth exemplary embodiment enables improving utilization efficiency of light of light source device 1C, and thus enables improving luminance of an image to be projected.

Sixth Exemplary Embodiment

Figure 12:
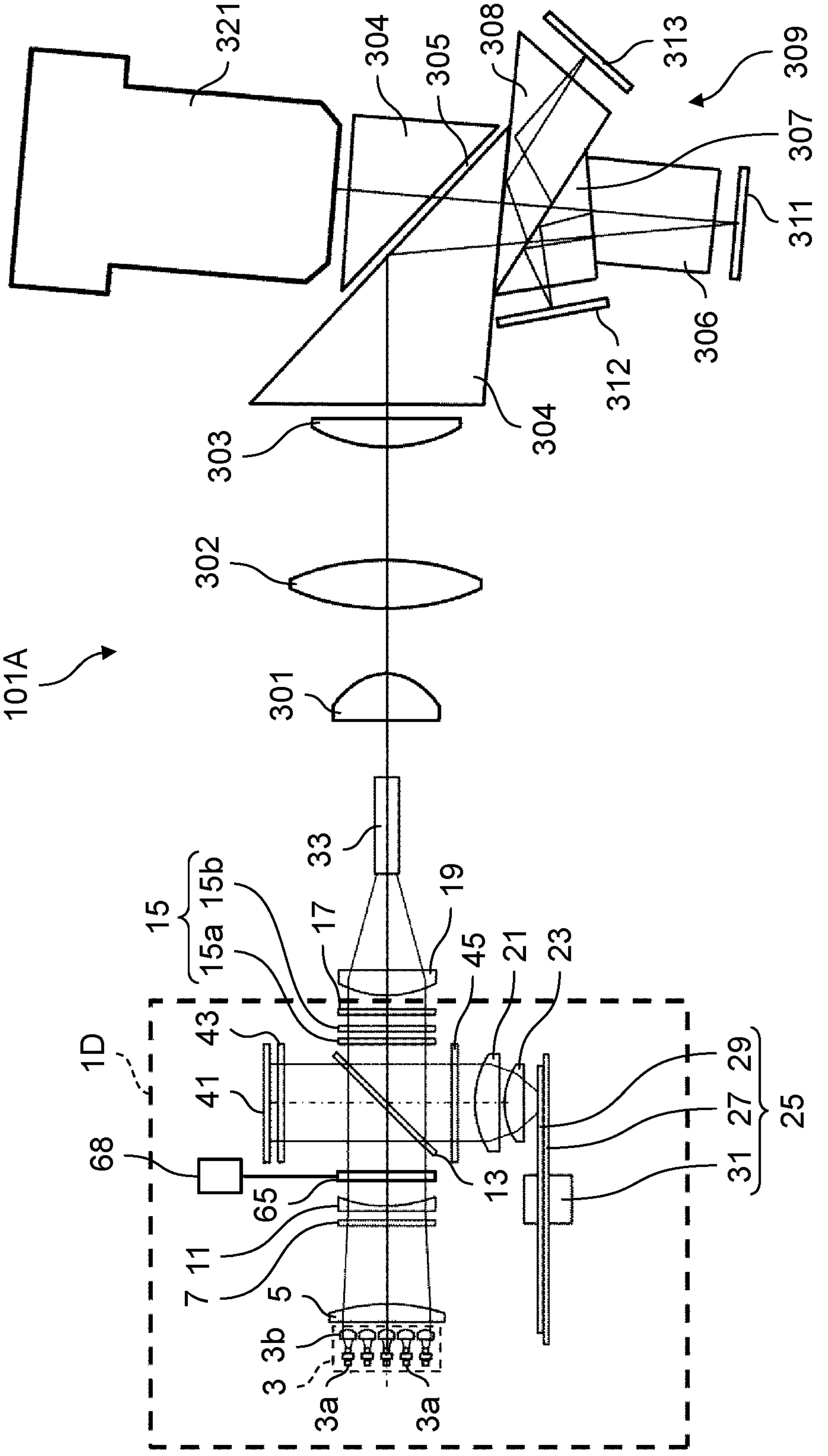
FIG. 12 is a diagram illustrating a configuration of a projection display apparatus according to a sixth exemplary embodiment.

Next, projection display apparatus 101A of a sixth exemplary embodiment will be described with reference to FIG. 12. FIG. 12 is a diagram illustrating a configuration of projection display apparatus 101A according to the sixth exemplary embodiment. As illustrated in FIG. 12, projection display apparatus 101A according to the sixth exemplary embodiment uses light source device 1D of the fourth exemplary embodiment.

Projection display apparatus 101A according to the sixth exemplary embodiment is a so-called three-chip projection display apparatus. A three-chip DLP system is an example of a projection display device using the present device, and the number of display elements may be other than three.

Light emitted from light source device 1D through light condensing element 19 and rod integrator 33 is imaged onto digital micromirror devices (DMDs) 311, 312, 313 as light modulators through a relay lens system including convex lenses 301, 302, 303.

Light guided through the relay lens system including convex lenses 301, 302, 303 is incident on total reflection prism 304 provided with small air gap 305. The light guided through the relay lens system and incident on total reflection prism 304 at an angle equal to or larger than an angle of total reflection is reflected by small air gap 305 to be changed in direction of traveling of the light, and is incident on color prism 309 including three glass blocks 306, 307, 308 provided with small air gap 305.

Blue light and fluorescent light are incident on first glass block 308 of color prism 309 from total reflection prism 304, and the blue light is first reflected on a spectral characteristic reflection layer that is provided in pre-stage a small air gap and that has characteristics of reflecting blue light, and then is changed in direction of traveling to travel to the total reflection prism 304. Subsequently, the blue light is incident on the small air gap between total reflection prism 304 and color prism 309 at an angle equal to or larger than the angle of total reflection to be incident on DMD 313 to display a blue image.

Subsequently, red light of the fluorescent light having passed through the small air gaps is reflected on a spectral characteristic reflection layer that is provided between second glass block 307 and third glass block 306 of color prism 309 and that has spectral characteristics of reflecting light in a wavelength region of red color and transmitting green light. The red light is then changed in direction of traveling toward first glass block 308.

The red light changed in direction of traveling is reflected again by the small air gap provided between first glass block 308 and second glass block 307 of color prism 309, and then the red light is changed in direction of traveling to be incident on DMD 312 for red color.

The fluorescent light having passed through the small air gap also include green light that passes through the spectral characteristic reflection layer that is provided between second glass block 307 and third glass block 306 of the color prism and that has spectral characteristics of reflecting light in the wavelength region of red color and transmitting green light, and the green light directly travels to third glass block 306 to be directly incident on DMD 311 for green color.

DMD 311, 312, 313 changes a traveling direction of light from a video circuit (not illustrated) by changing a direction of a mirror for each pixel in response to an image signal of each color.

The green light changed in direction of traveling in response to an image signal by DMD 311 for green color is incident on third glass block 306 of color prism 309, and passes through the spectral characteristic reflection layer provided between third glass block 306 and second glass block 307 of color prism 309.

The red light changed in direction of traveling in response to an image signal by DMD 312 for red color is incident on second glass block 307 of color prism 309, and is incident on a small air gap provided between second glass block 307 and first glass block 308 of color prism 309 at an angle equal to or larger than the angle of total reflection to be then reflected. After that, the red light changes in direction of traveling toward third glass block 306 of color prism 309, and is reflected on the spectral characteristic reflection layer provided between second glass block 307 and third glass block 306 of color prism 309. The red light then changes in direction of traveling to be combined with the green light.

The light combined by the spectral characteristic reflection layer travels toward first glass block 308 of color prism 309, and is incident on the small air gap provided between second glass block 307 and first glass block 308 of color prism 309 at an angle less than or equal to the angle of total reflection to pass through the small air gap.

Then, the blue light changed in direction of traveling in response to an image signal by DMD 313 for blue color is incident on first glass block 308 of color prism 309 and travels toward total reflection prism 304. The blue light is then incident on a gap provided between total reflection prism 304 and color prism 309 at an angle equal to or larger than the angle of total reflection to travel toward second glass block 307 of color prism 309. After that, the blue light is reflected by a spectral characteristic reflection layer provided facing first glass block 308 and in front of the small air gap provided between the first glass block 308 and second glass block 307 of color prism 309. The blue light is then changed in direction of traveling toward total reflection prism 304, and is combined with light from DMD 311 for green color and DMD 312 for red color to be incident on total reflection prism 304.

The light from DMDs 311, 312, 313 incident on total reflection prism 304 passes through total reflection prism 304, and is incident on projection lens unit 321 as a projection optical system to project the screen (not illustrated).

Light source device 1D and projection display apparatus 101A of the sixth exemplary embodiment enables improving utilization efficiency of light of light source device 1D, and thus enables improving luminance of an image to be projected.

Seventh Exemplary Embodiment

Figure 13:
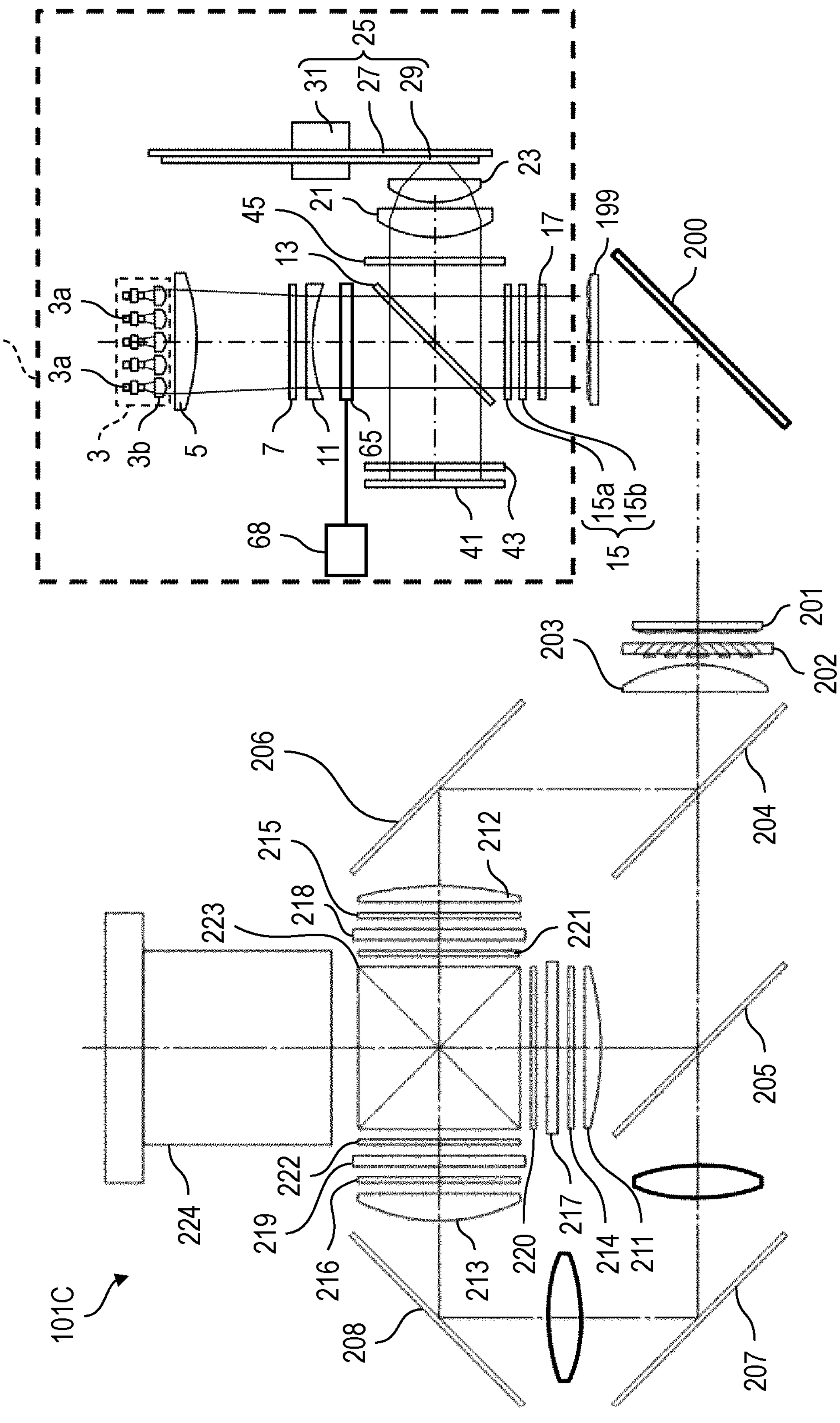
FIG. 13 is a diagram illustrating a configuration of a projection display apparatus according to a seventh exemplary embodiment.

Next, projection display apparatus 101B of a seventh exemplary embodiment will be described with reference to FIG. 13. FIG. 13 is the diagram illustrating the configuration of projection display apparatus 101B according to the seventh exemplary embodiment. As illustrated in FIG. 13, projection display apparatus 101B according to the seventh exemplary embodiment uses light source device 1D of the fourth exemplary embodiment.

Projection display apparatus 101B uses, as an image forming unit, an active matrix transmission liquid crystal panel in which a thin film transistor is formed in a pixel region in a TN (Twisted Nematic) mode or a VA (Vertical Alignment) mode.

Light emitted from light source device 1D is incident on projection lens 224 through an optical system including first lens array plate 199, mirror 200, second lens array plate 201, polarization conversion element 202, superposition lens 203, green-reflecting dichroic mirror 204, blue-reflecting dichroic mirror 205, reflection mirrors 206, 207, 208, relay lenses 209, 210, field lenses 211, 212, 213, incident side polarizing plates 214, 215, 216, liquid crystal panels 217, 218, 219, emission side polarizing plates 220, 221, 222, and color-combining prism 223 including a red-reflecting dichroic mirror and a blue-reflecting dichroic mirror.

White light from light source device 1D is incident on first lens array plate 199 including a plurality of lens elements. Flux of the light incident on first lens array plate 199 is divided into many fluxes of light. The many divided fluxes of light are reflected by mirror 200 to be converged on second lens array plate 201 including a plurality of lenses. The lens elements of first lens array plate 199 each have an opening shape similar to that of liquid crystal panel 217, 218, 219. The lens elements of second lens array plate 201 each have a focal distance determined to allow first lens array plate 199 and liquid crystal panels 217, 218, 219 to have a substantially conjugate relationship. Light output from second lens array plate 201 is incident on polarization conversion element 202.

Polarization conversion element 202 includes a polarized separation prism and a half wave plate, and converts natural light from a light source into light in one polarization direction. Fluorescent light is natural light, and thus is polarized and converted in one polarization direction. However, blue light is incident as S-polarized light, so that the blue light is converted into P-polarized light. Light from polarization conversion element 202 is incident on superposition lens 203. Superposition lens 203 is for superposing light received from each lens element of second lens array plate 201 on liquid crystal panels 217, 218, 219 to illuminate the panels. First lens array plate 199, second lens array plate 201, polarization conversion element 202, and superposition lens 203 constitute an illumination optical system.

Light from superposition lens 203 is separated into light of colors such as blue, green, and red by blue-reflecting dichroic mirror 204 and green-reflecting dichroic mirror 205, each of which serves as color separation means. The green light passes through field lens 211 and incident side polarizing plate 214 to be incident on liquid crystal panel 217. The blue light is reflected by reflection mirror 206, and then passes through field lens 212 and incident side polarizing plate 215 to be incident on liquid crystal panel 218. The red light passes through relay lenses 209, 210 to be refracted, and is reflected by reflection mirrors 207, 208, and then passes through field lens 213 and incident side polarizing plate 216 to be incident on liquid crystal panel 219.

Three liquid crystal panels 217, 218, 219 change polarization states of incident light by controlling voltage applied to pixels in response to image signals, and modulate light with incident side polarizing plates 214, 215, 216 in combination with emission side polarizing plates 220, 221, 222, respectively, the polarizing plates being disposed on both sides across corresponding liquid crystal panels 217, 218, 219 while being orthogonal to respective transmission axes, thereby forming images in green, blue, and red. Each color light having passed through corresponding one of emission side polarizing plates 220, 221, 222 is incident on color-combining prism 223 where color light in red and blue is reflected by the red-reflecting dichroic mirror and the blue-reflecting dichroic mirror, respectively, and combined with color light in green to be incident on projection lens 224. The light incident on projection lens 224 is enlarged and projected on a screen (not illustrated).

Projection display apparatus 101B of the seventh exemplary embodiment enables improving utilization efficiency of light of light source device 1D, and thus enables improving luminance of an image to be projected.

Other Exemplary Embodiments

As described above, the above exemplary embodiments have been described as examples of the techniques disclosed in the present application. The attached drawings and the detailed descriptions have been accordingly presented. However, the technique in the present disclosure is not limited thereto, and can also be applied to exemplary embodiments in which changes, replacements, additions, omissions, and the like have been made. Alternatively, the components described in the above exemplary embodiments may be combined to make an additional exemplary embodiment.

Additionally, the components described in the accompanying drawings and the detailed description may include not only components essential for solving the problem but also components that are not essential for solving the problem to illustrate the above technique. For this reason, it should not be immediately construed that those non-essential components are essential only based on the fact that those non-essential components are illustrated in the accompanying drawings or described in the detailed description.

The above exemplary embodiments are for illustrating the techniques in the present disclosure, so that various modifications, substitutions, additions, omissions, and the like can be made within the scope of claims or an equivalent scope thereof.

Overview of Exemplary Embodiments (1) A light source device according to the present disclosure includes: a light source element configured to emit first light in a first wavelength region; a first selective reflection element disposed at a position where the first light is incident, the first selective reflection element being configured to transmit a component of first linear polarized light, the component being defined by an incident direction and a reflection direction of incident light, and reflect a component of second linear polarized light having a vibration surface orthogonal to a vibration surface of the component of the first linear polarized light; a second selective reflection element disposed at a position for receiving incident light that has passed through or been reflected by the first selective reflection element, the second selective reflection element being configured to transmit or reflect the incident light in accordance with a wavelength region of the incident light; and a first polarization direction conversion element disposed between the first selective reflection element and the second selective reflection element, the first polarization direction conversion element being configured to convert the first linear polarized light having passed through or been reflected by the first selective reflection element into elliptical polarized light. The first polarization direction conversion element converts the elliptical polarized light. which is reflected by the second selective reflection element into the second linear polarized light to be incident on the first polarization direction conversion element again.

As a result, decrease in conversion efficiency can be suppressed to reduce change in a ratio of light to be received to each of two types of wavelength conversion layers to be converted into light different in wavelength region, the change being caused by a shift of a spot of light received.

(2) The light source device of item (1) is configured such that the first linear polarized light is any one of P-polarized light and S-polarized light, the second linear polarized light is the other of P-polarized light and S-polarized light, and the first polarization direction conversion element converts the first linear polarized light incident parallel to the optical axis into circular polarized light, converts the component of the first linear polarized light incident at an angle with respect to the optical axis into elliptical polarized light, and converts the circular polarized light and the elliptical polarized light reflected by the second selective reflection element and incident on the first polarization direction conversion element again into the second linear polarized light.

(3) The light source device of item (1) or (2) is configured such that the first polarization direction conversion element includes at least two wave plates.

(4) The light source device of item (3) is configured such that the at least two wave plates are different in slow axis from each other.

(5) The light source device of item (4) is configured such that the at least two wave plates include a wave plate having a slow axis at an angle of 45 degrees and a wave plate having a slow axis at an angle of 90 degrees.

(6) The light source device of any one of items (3) to (5) is configured such that at least one of the at least two wave plates is adjustable for direction of the slow axis.

(7) The light source device of item (6) further includes a rotation drive unit that rotates at least one wave plate of the at least two wave plates.

(8) A light source device of the present disclosure includes: a light source element configured to emit first light in a first wavelength region; a first selective reflection element disposed at a position where the first light is incident, the first selective reflection element being configured to transmit or reflect first linear polarized light and reflect or transmit second linear polarized light, the first linear polarized light and the second linear polarized light being defined by an incident direction and a reflection direction of light incident on the first selective element; a second selective reflection element disposed at a position for receiving incident light that has passed through or been reflected by the first selective reflection element, the second selective reflection element being configured to transmit or reflect the incident light in accordance with a wavelength region of the incident light; a wavelength conversion element disposed at a position where the light reflected by or having passed through the first selective reflection element is incident, the wavelength conversion element being configured to converts the light reflected by or having passed through the first selective reflection element into second light in a second wavelength region; a reflection element provided to allow the first selective reflection element to be disposed between the wavelength conversion element and the reflection element that is configured to reflect light reflected by the wavelength conversion element and having passed through or reflected by the first selective reflection element; and a second polarization direction conversion element disposed between the first selective reflection element and the reflection element.

(9) The light source device of the present disclosure is configured such that the second polarization direction conversion element includes at least two wave plates.

(10) The light source device of item (9) is configured such that the at least two wave plates are different in slow axis from each other.

(11) The light source device of item (9) or (10) is configured such that at least one of the at least two wave plates is adjustable for direction of the slow axis.

(12) The light source device of any one of items (1) to (7) includes: a wavelength conversion element that is disposed at a position on which light reflected by the first selective reflection element is incident, and is configured to convert light reflected by the first selective reflection element into second light in a second wavelength region; a reflection element configured to reflect the second light emitted from the wavelength conversion element and having passed through the first selective reflection element toward the first selective reflection element; a second polarization direction conversion element disposed between the wavelength conversion element and the reflection element; and a third polarization direction conversion element disposed between the wavelength conversion element and the first selective reflection element.

(13) The light source device of item (12) is configured such that the third polarization direction conversion element includes at least two wave plates.

(14) The light source device of item (13) is configured such that the at least two wave plates of the third polarization direction conversion element are different in slow axis from each other.

(15) The light source device of item (13) or (14) is configured such that at least one of the at least two wave plates of the third polarization direction conversion element is adjustable for direction of the slow axis.

(16) A projection display apparatus according to the present disclosure includes: the light source device of any one of items (1) to (15); a light modulator that generates image light by using light emitted from the light source device; and a projection optical system that projects the image light.

The present disclosure is applicable to a wavelength conversion device that receives illumination light to perform wavelength conversion of light, a phosphor wheel, a light source device that uses light subjected to wavelength conversion performed by the phosphor wheel, and a projection display apparatus.

What is claimed is:

1. A light source device comprising:

a light source element configured to emit first light in a first wavelength region;

a first selective reflection element disposed at a position where the first light is incident, the first selective reflection element being configured to: (i) transmit a component of first linear polarized light, the component of the first linear polarized light being defined by an incident direction and a reflection direction of incident light; and (ii) reflect a component of second linear polarized light having a vibration surface orthogonal to a vibration surface of the component of the first linear polarized light;

a second selective reflection element disposed at a position for receiving incident light that has passed through or been reflected by the first selective reflection element, the second selective reflection element being configured to transmit or reflect the incident light in accordance with a wavelength region of the incident light; and a first polarization direction conversion element disposed between the first selective reflection element and the second selective reflection element, the first polarization direction conversion element being configured to convert the first linear polarized light that has passed through or been reflected by the first selective reflection element into elliptical polarized light, wherein:

the first polarization direction conversion element is configured to convert the elliptical polarized light that is reflected by the second selective reflection element into the second linear polarized light to be incident on the first polarization direction conversion element again;

the first polarization direction conversion element includes wave plates; and at least one of the wave plates is adjustable for direction of a slow axis.

2. The light source device according to claim 1, wherein:

the first linear polarized light is P-polarized light;

the second linear polarized light is S-polarized light; and the first polarization direction conversion element is configured to:

convert the first linear polarized light parallel to an optical axis into circular polarized light, and convert the component of the first linear polarized light at an angle with respect to the optical axis into elliptical polarized light of non-circular polarized light; and convert the circular polarized light and the elliptical polarized light of non-circular polarized light reflected by the second selective reflection element and incident on the first polarization direction conversion element again into the second linear polarized light.

3. The light source device according to claim 1, wherein:

the first linear polarized light is S-polarized light;

the second linear polarized light is P-polarized light; and the first polarization direction conversion element is configured to:

convert the first linear polarized light parallel to an optical axis into circular polarized light, and convert the component of the first linear polarized light at an angle with respect to the optical axis into elliptical polarized light of non-circular polarized light; and convert the circular polarized light and the elliptical polarized light of non-circular polarized light reflected by the second selective reflection element and incident on the first polarization direction conversion element again into the second linear polarized light.

4. The light source device according to claim 1, wherein the wave plates include;

a first quarter wave plate having a first slow axis; and a second quarter wave plate having a second slow axis that is different from the first slow axis.

5. The light source device according to claim 4, wherein:

the first slow axis is at an angle of 45 degrees; and the second slow axis is at an angle of 90 degrees.

6. The light source device according to claim 1, further comprising a rotation drive unit configured to rotate the at least one of the wave plates.

7. A projection display apparatus comprising:

the light source device according to claim 1;

a light modulator configured to generate image light using light emitted from the light source device; and a projection optical system configured to project the image light.

8. A light source device comprising:

a light source element configured to emit first light in a first wavelength region;

a first selective reflection element disposed at a position where the first light is incident, the first selective reflection element being configured to: (i) transmit a component of first linear polarized light, the component of the first linear polarized light being defined by an incident direction and a reflection direction of incident light; and (ii) reflect a component of second linear polarized light having a vibration surface orthogonal to a vibration surface of the component of the first linear polarized light;

a second selective reflection element disposed at a position for receiving incident light that has passed through or been reflected by the first selective reflection element, the second selective reflection element being configured to transmit or reflect the incident light in accordance with a wavelength region of the incident light;

a first polarization direction conversion element disposed between the first selective reflection element and the second selective reflection element, the first polarization direction conversion element being configured to convert the first linear polarized light that has passed through or been reflected by the first selective reflection element into elliptical polarized light;

a wavelength conversion element disposed at a position on which light reflected by or that has passed through the first selective reflection element is incident, the wavelength conversion element being configured to convert light reflected by or that has passed through the first selective reflection element into second light in a second wavelength region;

a reflection element configured to reflect the second light emitted from the wavelength conversion element and that has passed through or been reflected by the first selective reflection element toward the first selective reflection element;

a second polarization direction conversion element disposed between the reflection element and the first selective reflection element; and a third polarization direction conversion element disposed between the wavelength conversion element and the first selective reflection element, wherein the first polarization direction conversion element is configured to convert the elliptical polarized light that is reflected by the second selective reflection element into the second linear polarized light to be incident on the first polarization direction conversion element again.

9. The light source device according to claim 8, wherein the third polarization direction conversion element includes wave plates.

10. The light source device according to claim 9, wherein the wave plates have respective slow axes that are different from each other.

11. The light source device according to claim 9, wherein at least one of the wave plates is adjustable for direction of a slow axis.

12. The light source device according to claim 8, wherein:

the first light is blue; and the second light is yellow.

13. A light source device comprising:

a light source element configured to emit first light in a first wavelength region;

a first selective reflection element disposed at a position where the first light is incident, the first selective reflection element being configured to: (i) transmit or reflect first linear polarized light; and (ii) reflect or transmit second linear polarized light, the first linear polarized light and the second linear polarized light being defined by an incident direction and a reflection direction of light incident on the first selective reflection element;

a second selective reflection element disposed at a position for receiving incident light that has passed through or been reflected by the first selective reflection element, the second selective reflection element being configured to transmit or reflect the incident light in accordance with a wavelength region of the incident light;

a wavelength conversion element disposed at a position where the light reflected by or that has passed through the first selective reflection element is incident, the wavelength conversion element being configured to convert the light reflected by or that has passed through the first selective reflection element into second light in a second wavelength region;

a reflection element configured to reflect light reflected by the wavelength conversion element and reflected by or that has passed through the first selective reflection element; and a second polarization direction conversion element disposed between the first selective reflection element and the reflection element.

14. The light source device according to claim 13, wherein the second polarization direction conversion element includes wave plates.

15. The light source device according to claim 14, wherein the wave plates have respective slow axes that are different from each other.

16. The light source device according to claim 14, wherein at least one of the wave plates is adjustable for direction of a slow axis.

17. The light source device according to claim 13, further comprising a half wave plate disposed between the light source element and the first selective reflection element, and configured to rotate.

18. The light source device according to claim 17, further comprising a rotation drive unit configured to rotate the half wave plate.

19. The light source device according to claim 13, wherein:

the first light is blue; and the second light is yellow.

20. A projection display apparatus comprising:

the light source device according to claim 13;

a light modulator configured to generate image light using light emitted from the light source device; and a projection optical system configured to project the image light.

* * * * *